United States Patent

Akada et al.

[11] Patent Number: 5,900,995
[45] Date of Patent: May 4, 1999

[54] DRIVING DEVICE AND OPTICAL APPARATUS

[75] Inventors: Hiroshi Akada; Tatsuo Chigira; Junichi Murakami; Hidekage Sato, all of Kanagawa-ken, Japan

[73] Assignee: Canon Kabushiki Kaisha, Tokyo, Japan

[21] Appl. No.: 08/561,386

[22] Filed: Nov. 21, 1995

[30] Foreign Application Priority Data

| Nov. 25, 1994 | [JP] | Japan | 6-315710 |
| Mar. 10, 1995 | [JP] | Japan | 7-079604 |
| Jun. 9, 1995 | [JP] | Japan | 7-168201 |

[51] Int. Cl.⁶ ............ G02B 7/02; G02B 15/14; G02B 9/02
[52] U.S. Cl. .......... 359/824; 359/696; 396/508
[58] Field of Search .......... 359/824, 814, 359/694, 696, 697, 704; 396/87, 133, 462, 464, 508; 310/323

[56] References Cited

U.S. PATENT DOCUMENTS

| 5,053,798 | 10/1991 | Ohara, et al. | 354/400 |
| 5,489,959 | 2/1996 | Akada | 396/508 |
| 5,499,143 | 3/1996 | Sakamoto et al. | 359/824 |
| 5,602,681 | 2/1997 | Nakayama et al. | 359/698 |
| 5,675,444 | 10/1997 | Ueyama et al. | 359/824 |

FOREIGN PATENT DOCUMENTS

| 3-29837 | 2/1991 | Japan. |
| 6-186613 | 7/1994 | Japan. |

OTHER PUBLICATIONS

Patent Abstracts, Japan 92–330398 (11/18/92), vol. 17, 168, p. 165.

*Primary Examiner*—Georgia Epps
*Assistant Examiner*—Ricky Mack
*Attorney, Agent, or Firm*—Fitzpatrick, Cella, Harper & Scinto

[57] ABSTRACT

A lens driving device includes a stator, a rotor magnetized to have a plurality of poles, an arm fixed to the rotor in such a manner as to be rotatable together with the rotor, a moving member for rectilinearly moving a lens in response to a rotation of the arm and a coil for causing the stator to generate a magnetic flux to rotate the rotor.

41 Claims, 29 Drawing Sheets

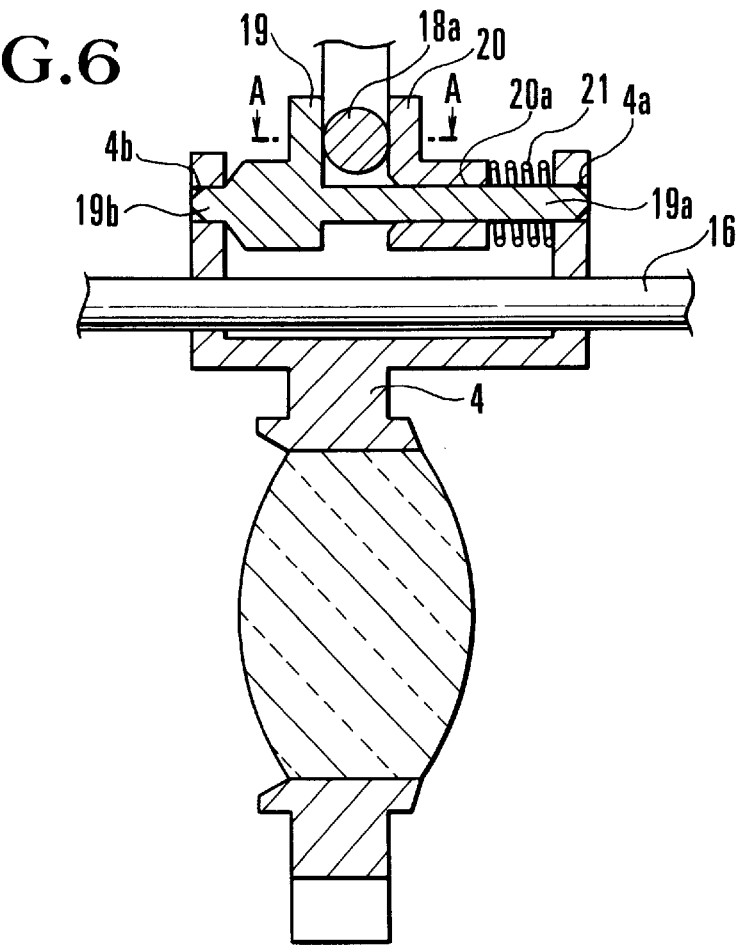
FIG.6
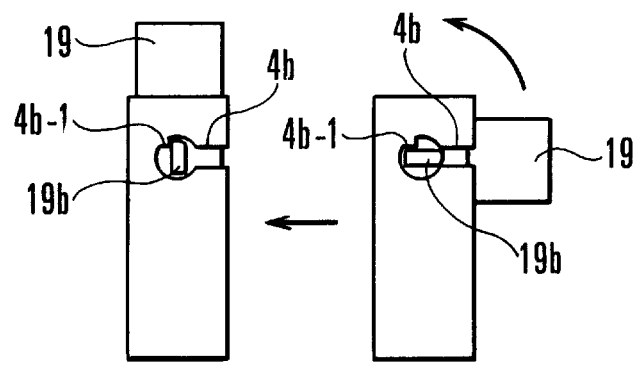
FIG.7(b)  FIG.7(a)
 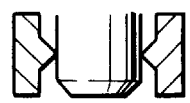
FIG.8(a)  FIG.8(b)

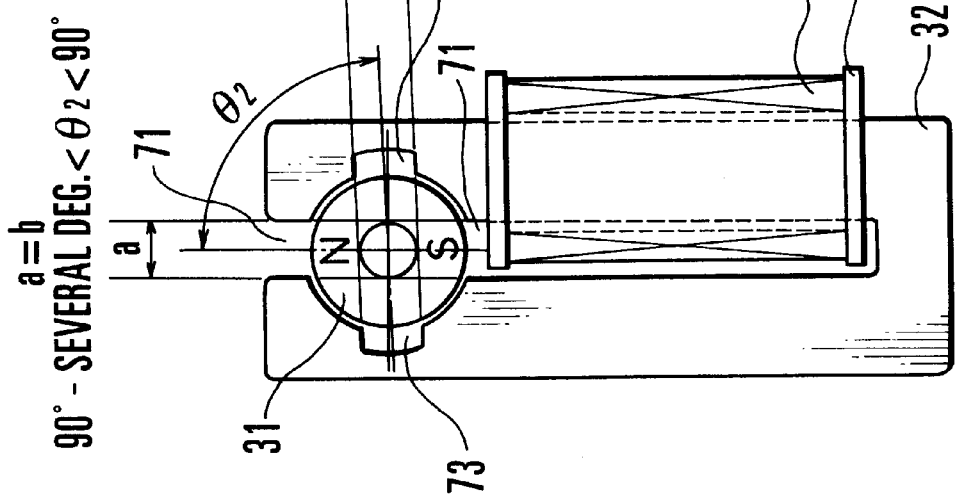
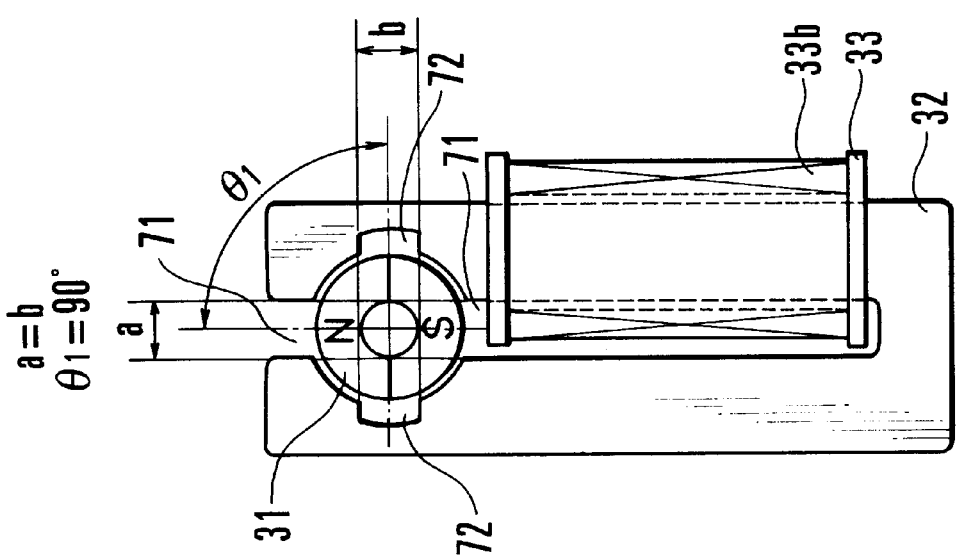
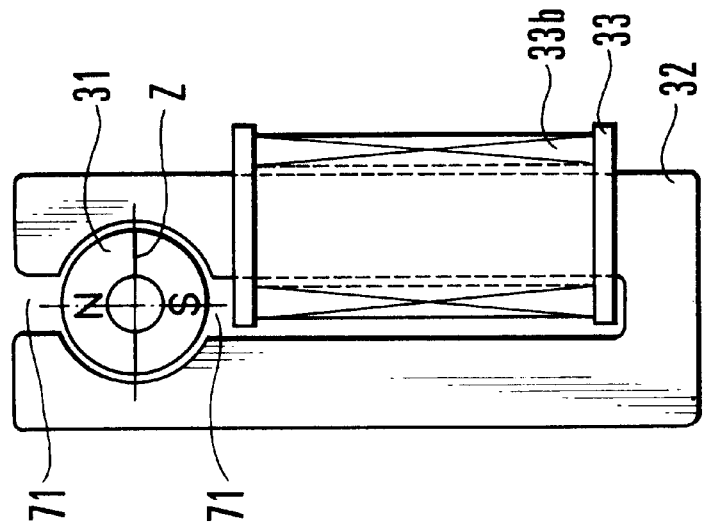

F I G. 15 (a)
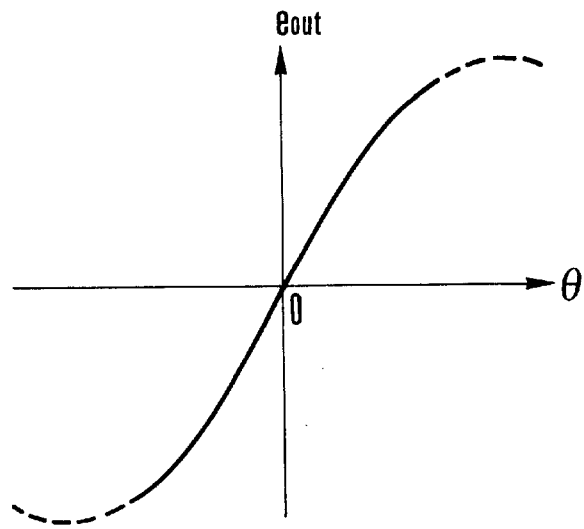
F I G. 15 (b)
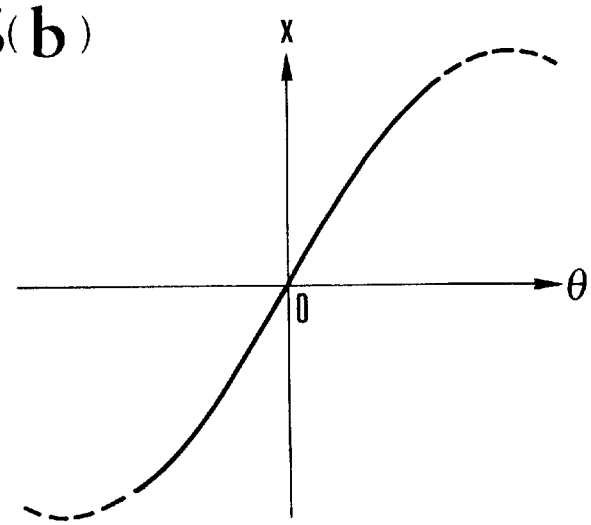
F I G. 15 (c)
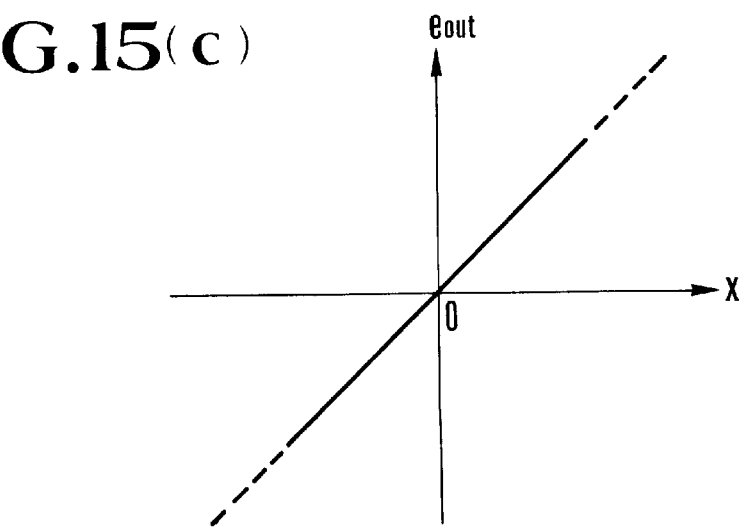

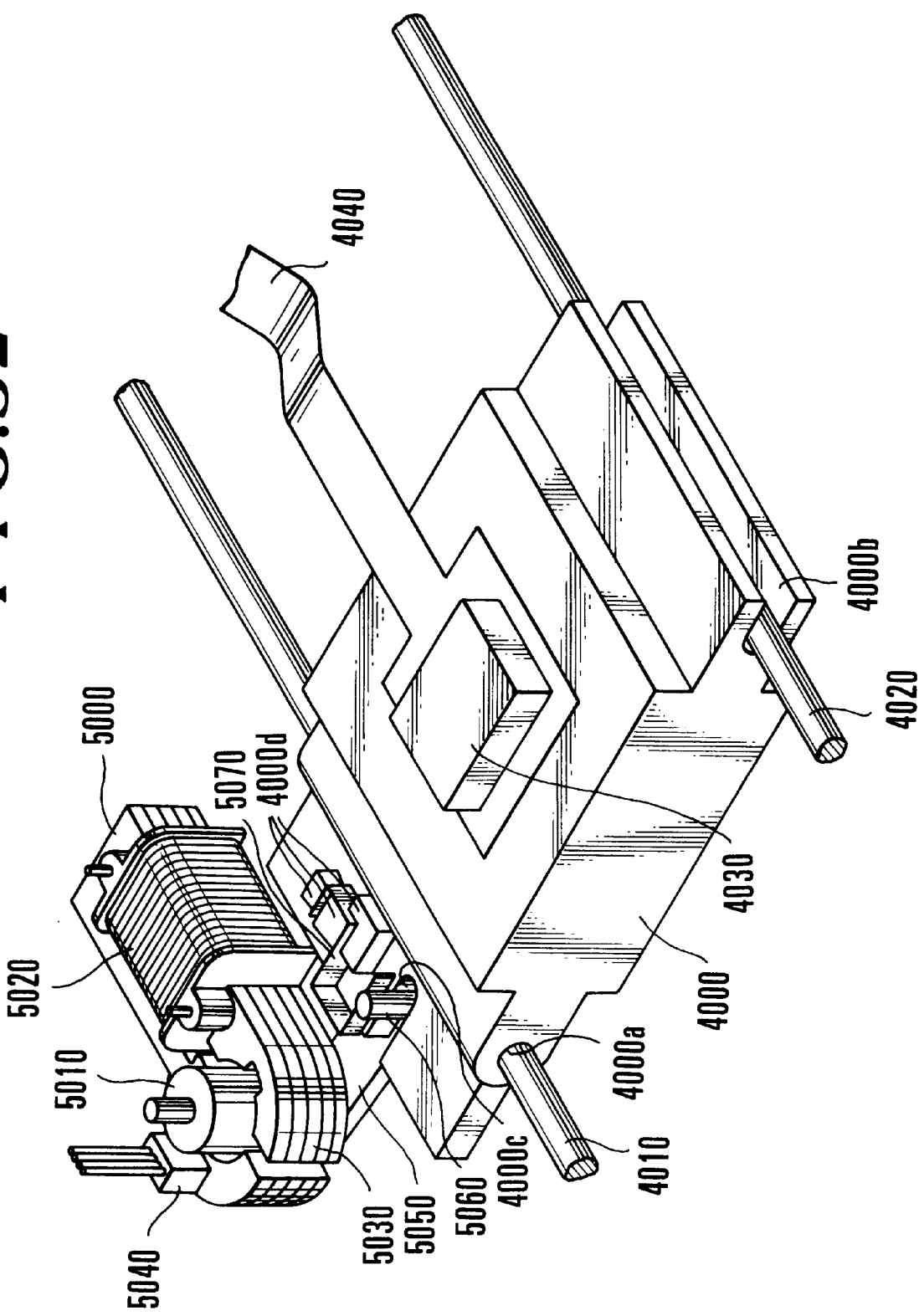

DRIVING DEVICE AND OPTICAL APPARATUS

BACKGROUND OF THE INVENTION

1. Field of the Invention

The present invention relates to a driving device and an optical apparatus, such as a camera, having the driving device.

2. Description of the Related Art

Conventionally, stepping motors have been employed as driving means for driving lenses.

However, such a conventional arrangement has the following problem.

In general, a stepping motor involves unique variations in rotating torque (torque ripples) during a stepping operation. If the stepping motor is rotated, the driving part of the stepping motor produces a vibration, and this vibration is transmitted to a lens holding member and the like and causes the problem of producing noise.

There is also a device which is arranged to move a lens barrel, which is a driven object, along the optical axis by means of a voice coil motor to detect the position of a moving lens by means of a magneto-resistance element.

Since this driving device is of a so-called direct drive type, the noise problem can be solved, but a weight to be moved becomes the total of the weight of the lens barrel which is a driven object and the weight of a movable portion of the voice coil motor. As a result, a thrust force stronger than the thrust force required to move the lens barrel is needed, so that a voice coil motor of a large size must be prepared or a large electric power is needed.

SUMMARY OF THE INVENTION

It is, therefore, an object of the present invention to provide a small-sized driving device capable of driving an object (e.g., a lens) more silently and at a higher speed than a conventional driving device.

To achieve the above object, according to one aspect of the present invention, a driving device for driving a lens comprises a stator, a rotor magnetized to have a plurality of poles, an arm fixed to the rotor in such a manner as to be rotatable together with the rotor, a moving member for rectilinearly moving the object in response to a rotation of the arm, and a coil for causing the stator to generate a magnetic flux to rotate the rotor.

According to another aspect of the present invention, a driving device comprises driving means for moving an object, detecting means for detecting a position of the object, control means for controlling the driving means according to an output of the detecting means, and varying means for varying an output characteristic of the detecting means.

According to another aspect of the present invention, a driving device comprises a rotor, an arm fixed to the rotor in such a manner as to be rotatable together with the rotor, a moving member for rectilinearly moving the object in response to a rotation of the arm, and driving means for rotating the rotor, and a rotational position of the rotor which corresponds to an intermediate position in a moving range of the object is set to a position at which a torque generated in the rotor by the driving means reaches its maximum.

According to another aspect of the present invention, a driving device comprises a stator, a rotor magnetized to have a plurality of poles, converting means for converting a rotation of the rotor into a rectilinear motion to move an object rectilinearly, the converting means including an arm fixed to the rotor in such a manner as to be rotatable together with the rotor, and a coil for causing the stator to generate a magnetic flux to rotate the rotor.

According to another aspect of the present invention, a driving device comprises a rotor, converting means for converting a rotation of the rotor into a rectilinear motion to move an object rectilinearly, the converting means including an arm fixed to the rotor in such a manner as to be rotatable together with the rotor, driving means for rotating the rotor, and a sensor for detecting a rotational position of the rotor, and an output of the sensor and a position of the object form a linear relationship.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 6 is a diagrammatic cross-sectional view of constituent elements disposed in the vicinity of the output shaft of the driving source of the driving device shown in FIG. 1;

FIGS. 7(a) and 7(b) are schematic explanatory views showing the manner of the engagement between a clamping member and a lens holding member of the driving device shown in FIG. 1;

FIGS. 8(a), and 8(b) are schematic cross-sectional views showing different examples of the clamping member of the driving device of FIG. 1 as well as the shapes of clamping portions of the respective examples;

FIGS. 10(a), 10(b) and 10(c) are schematic views respectively showing different shapes of the stator and the corresponding rotational angular positions of the rotor;

FIGS. 15(a), 15(b) and 15(c) are views showing the position of a driven object and the output signal of rotational position detecting means in the embodiment shown in FIG. 14;

FIG. 32 a perspective view showing an essential portion of a driving device for driving a magnetic head according to another embodiment of the present invention.

DETAILED DESCRIPTION OF THE PREFERRED EMBODIMENTS

Figure 1:
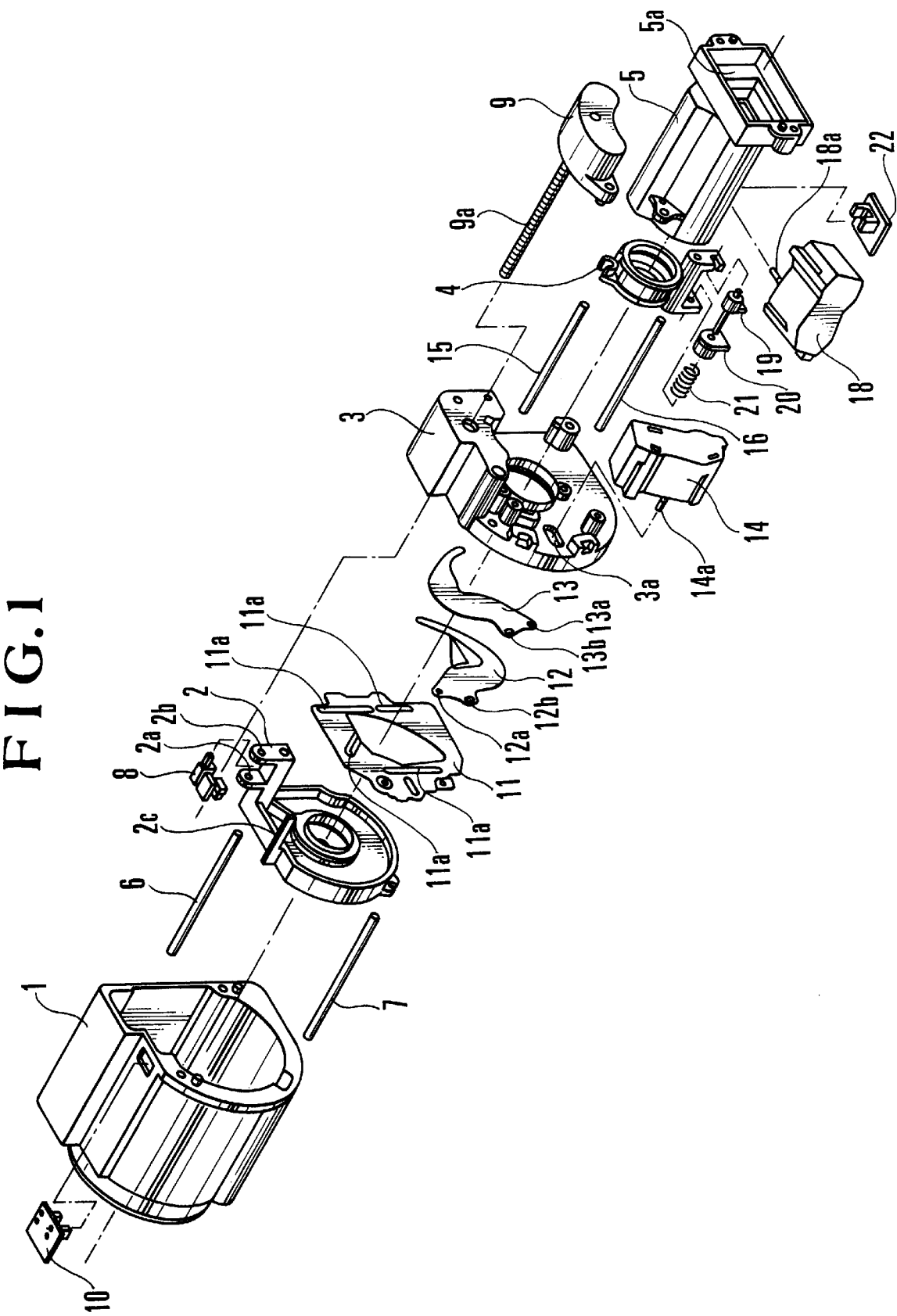
FIG. 1 is an exploded perspective view of a lens driving device according to one embodiment of the present invention.

FIG. 1 is an exploded perspective view of a lens driving device according to one embodiment of the present invention. The lens driving device shown in FIG. 1 includes a fixed first lens holding member 1 for holding a first lens group, a second lens holding member 2 for holding a second lens group, the second lens group being arranged to move along the optical axis for a zooming purpose, a fixed third lens holding member 3 for holding a third lens group, a fourth lens holding member 4 for holding a fourth lens group, the fourth lens group being arranged to move along the optical axis for a focusing purpose, and a rear fixed lens barrel 5 having a mounting portion 5a on which an image pickup element (not shown) is mounted.

The second lens holding member 2 is supported for movement along the optical axis by guide bars 6 and 7, which are fixed by the first lens holding member 1 and the third lens holding member 3. A rack 8, which is supported by holes 2a and 2b formed in the second lens holding member 2, is meshed with an output screw shaft 9a of a stepping motor (zooming driving part) 9 of arc-like shape, which is fixed to the-third lens holding member 3. Accordingly, the stepping motor 9 drives the second lens holding member 2 along the optical axis by rotating the output screw shaft 9a.

A projection 2c of the second lens holding member 2 and a switch 10, which is fixed to the first lens holding member 1, constitute position detecting means for detecting the position of the second lens holding member 2. The initial position of the second lens holding member 2 is determined on the basis of the output of the switch 10.

Iris blades 12 and 13 have holes 12a and 13a through which positioning pins (not shown) of the third lens holding member 3 are inserted, respectively. The iris blades 12 and 13 are capable of rotating about the respective positioning pins in directions perpendicular to the optical axis along guide rails (not shown) provided on the third lens holding member 3 and along guide rails 11a provided on an iris pressing plate 11. An iris driving part 14 of arc-like shape is fixed to the third lens holding member 3, and an output shaft 14a of the iris driving part 14 is inserted through slots 12b and 13b of the respective iris blades 12 and 13. The output shaft 14a of the iris driving part 14 drives the iris blades 12 and 13 by swinging along an arc-shaped hole 3a.

The fourth lens holding member 4 is supported for movement along the optical axis by guide bars 15 and 16 which are fixed by the third lens holding member 3 and the fifth lens holding member 5. The fourth lens holding member 4 is provided with clamping members 19 and 20 for clamping an output shaft 18a of a driving source 18 which drives the fourth lens holding member 4, as well as a coil spring 21 for supplying a clamping force.

Figure 2:
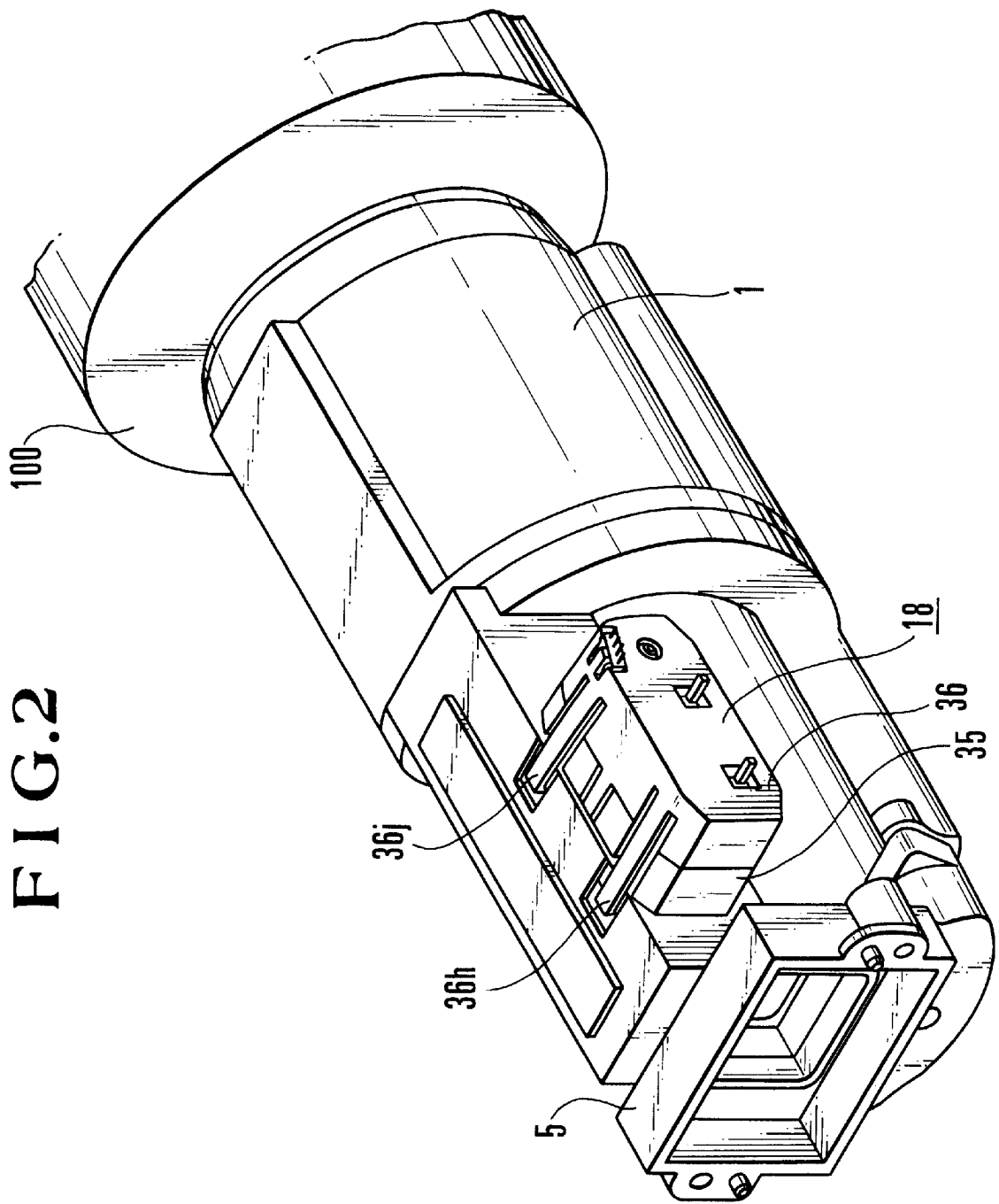
FIG. 2 is a perspective view showing one example of the arrangement of a driving source of the driving device shown in FIG. 1.
Figure 3:
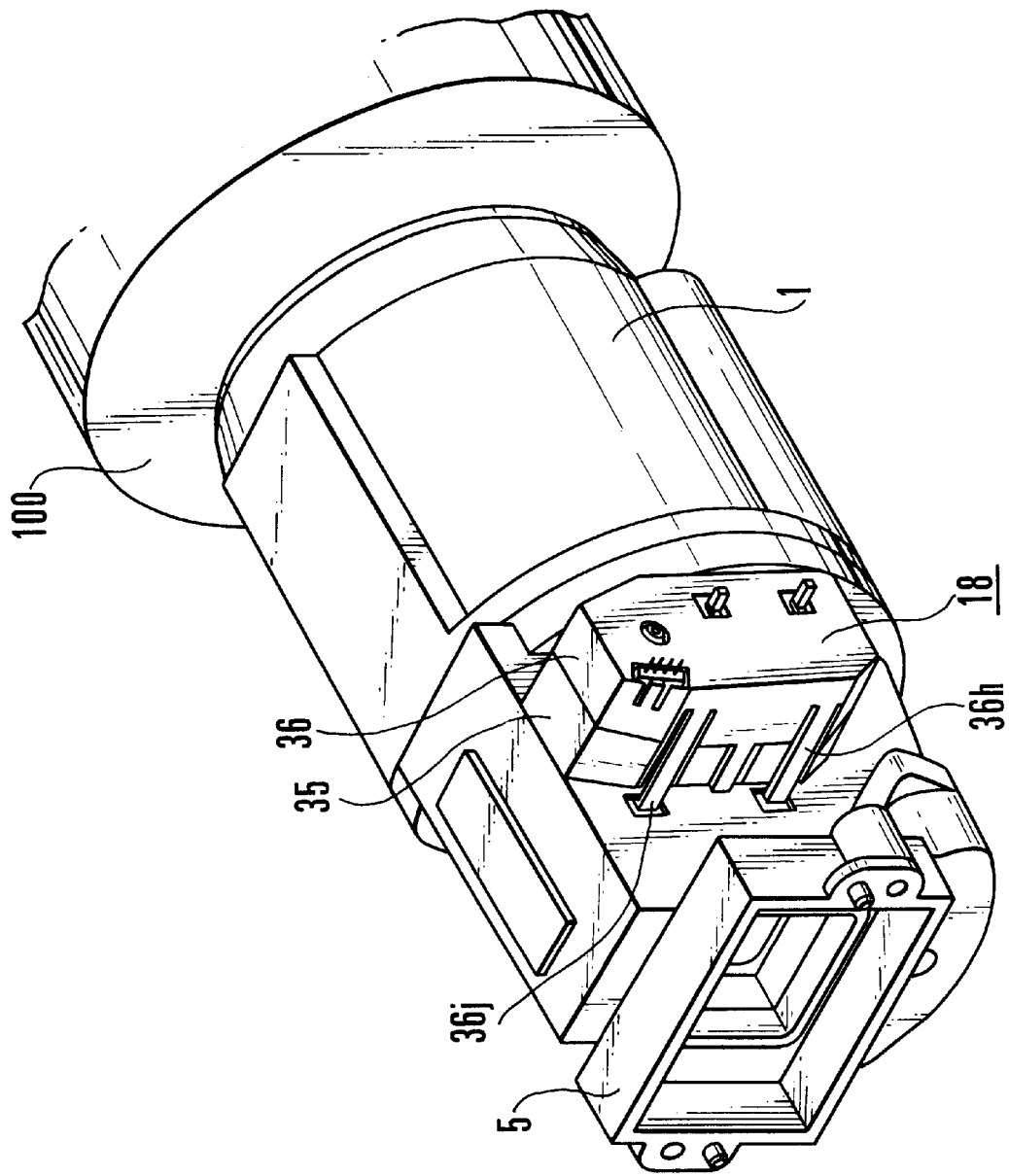
FIG. 3 is a perspective view showing another example of the arrangement of the driving source of the driving device shown in FIG. 1.

FIG. 2 is a perspective view of the lens driving device, showing the state in which the driving source 18 is disposed with its longitudinal direction being approximately parallel to the optical axis. In the case of a small lens unit using a short lens barrel which is reduced in size in the direction of the optical axis, the driving source 18 may be disposed with the longitudinal direction being approximately perpendicular to the optical axis as shown in FIG. 3. This embodiment adopts the arrangement shown in FIG. 2, by way of example.

Figure 4:
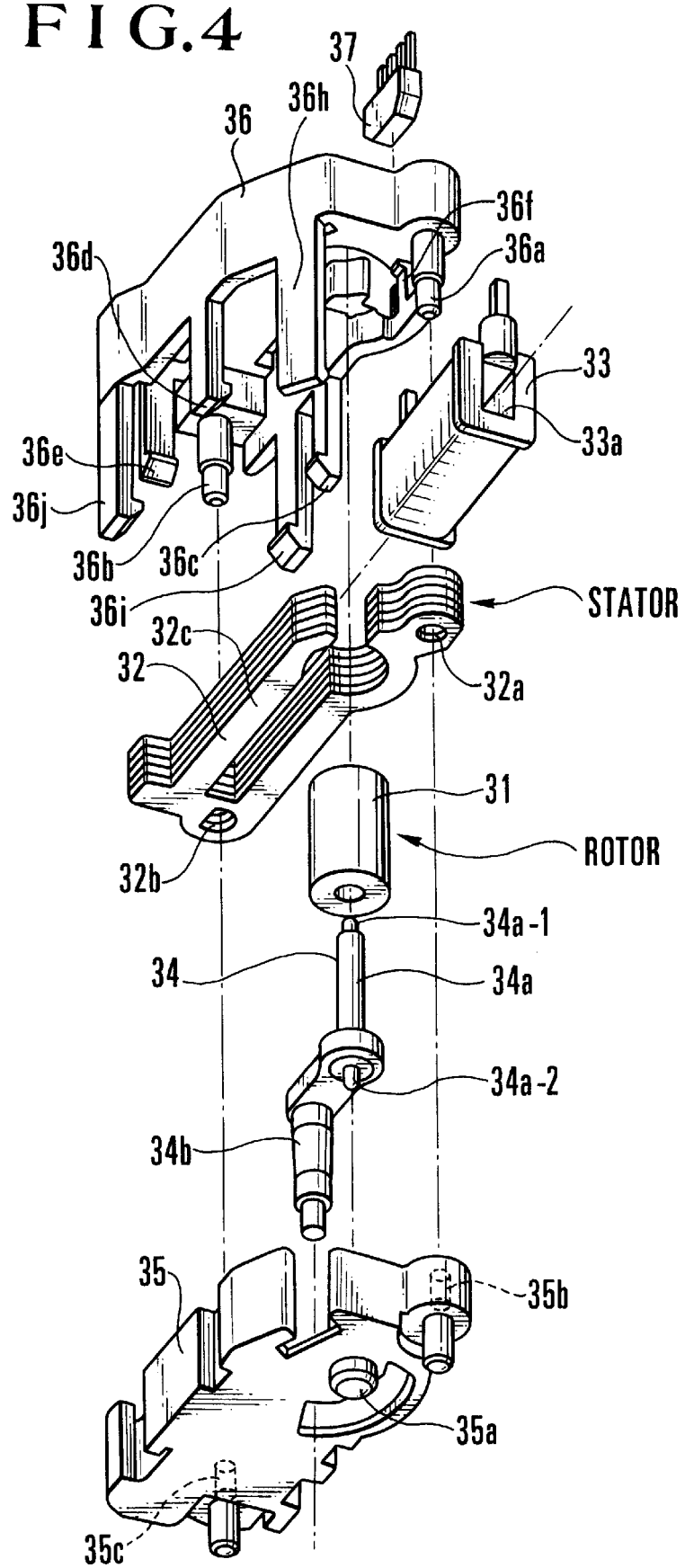
FIG. 4 is an exploded perspective view of the driving source of the driving device shown in FIG. 1.

The construction of the driving source 18 will be described in detail with reference to FIG. 4. In the driving source 18, a rotor 31 is magnetized to have two poles (which are mainly magnetized in directions perpendicular to the axis of the rotor 31), and a stator 32 is made from a magnetic material, such as a silicon steel sheet, and has positioning holes 32a and 32b. A bobbin 33 is formed of resin and has a hole 33a through which to insert the stator 32, and a conductor is wound around the bobbin 33. An arm 34 is integrally formed and also serves as a rotor shaft. A cap 35 is formed of resin, and has a bearing portion 35a and holes 35b and 35c for engagement with a case 36 which will be described later.

The case 36, formed of resin, includes a clamping portion 36e having at its tip portion a claw for clamping the stator 32, projections 36a and 36b for positioning the cap 35 as well as the stator 32, clamping portions 36c and 36d each having a claw for clamping the cap 35, clamping portions 36h, 36i and 36j having claws for engagement with corresponding holes formed in the fixed lens barrel 5, a clamping portion 36f having a claw for clamping a magnetic detecting element 37, and a bearing portion 36g (shown in FIG. 5) for receiving one end 34a-1 of a shaft portion 34a of the arm 34.

The rotor 31 is fitted onto the shaft portion 34a of the arm 34 which serves as a rotor shaft. The bobbin 33 is fitted onto a straight portion 32c of the stator 32 by inserting the straight portion 32c through the hole 33a formed in the bobbin 33. The stator 32 onto which the bobbin 33 is fitted is held by the engagement between the holes 32a and 32b formed in the stator 32 and the respective projections 36a and 36b formed on the case 36. In addition, the stator 32 is fixed by the clamping portion 36e formed on the case 36.

When the projections 36a and 36b formed on the case 36 are respectively fitted onto the holes 35b and 35c formed in the cap 35 with the opposite ends of the shaft portion 34a of the arm 34 onto which the rotor 31 is fitted being respectively engaged with the bearing portion 36g provided in the case 36 and the bearing portion 35a provided in the cap 35, the clamping portions 36c and 36d formed on the case 36 engage with the cap 35, whereby the case 36 securely holds the cap 35.

Figure 5:
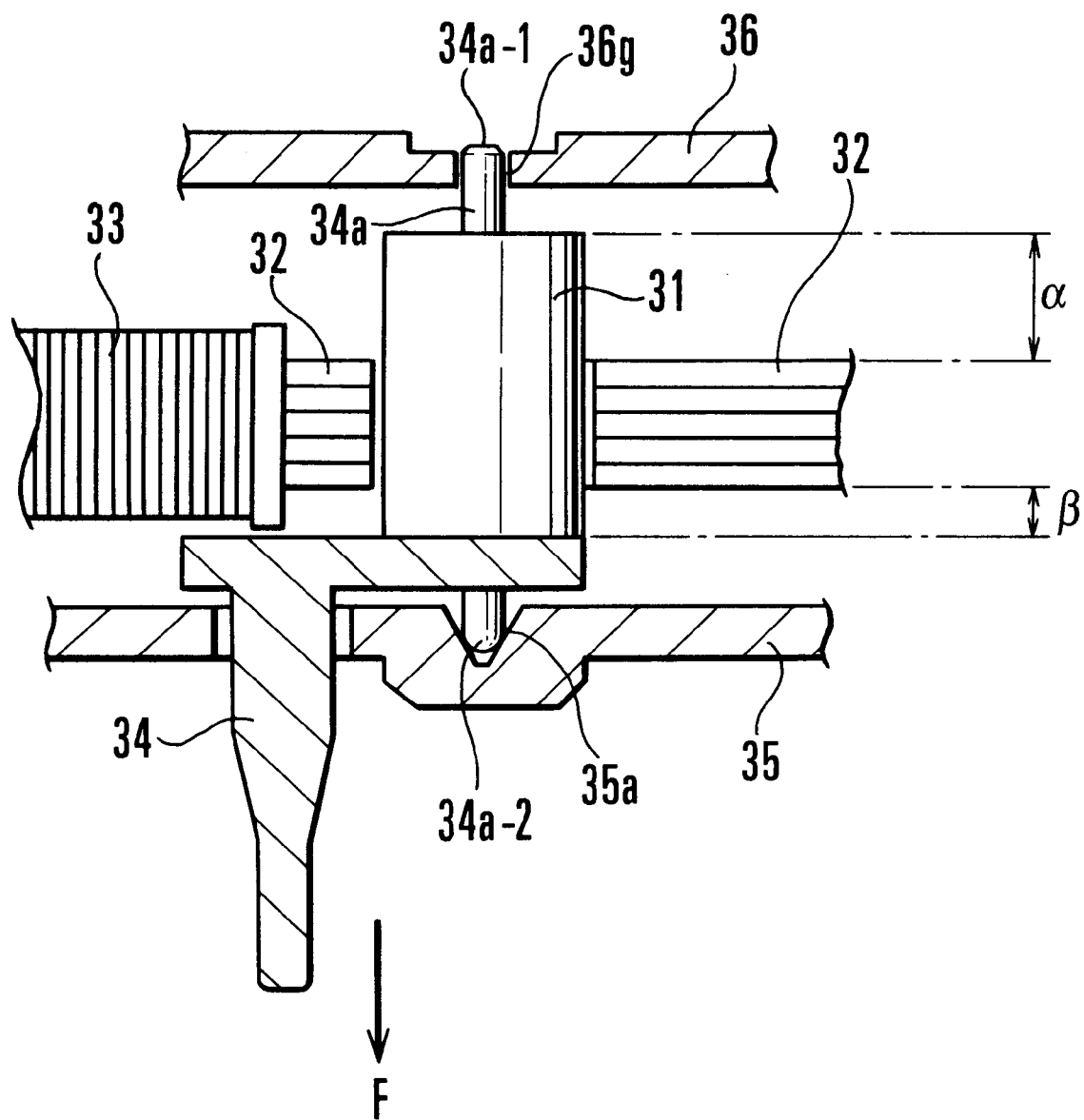
FIG. 5 is a diagrammatic cross-sectional view of a rotor and other associated constituent elements in the driving source of the driving device shown in FIG. 1.

FIG. 5 is a cross-sectional view of the rotor 31 and its peripheral components of the assembled driving source 18. The bearing portion 36g, which receives the end 34a-1 of the shaft portion 34a of the arm 34, is a through hole, and the bearing portion 35a which receives another end 34a-2 of the shaft portion 34a of the arm 34, has a tapered shape so that the rotor 31 and the arm 34 can be prevented from moving along the axis of the rotor 31. The end 34a-2 of the shaft portion 34a is of a spherical shape. Portions α and β of the rotor 31 which respectively project upward and downward from the opposite end faces of the stator 32 are selected to assume the relationship of α>β. Accordingly, since a force to make this relationship closer to α=β works on the rotor 31 (the force indicated by an arrow F in FIG. 5), the bearing portion 35a and the end 34a-2 of the shaft portion 34a are at all times maintained in contact with each other without looseness.

The clamping portions 36h, 36i and 36j are brought into engagement with the corresponding holes (not shown) formed in the fixed lens barrel 5, whereby the driving source 18 having the above-described construction is fixedly held by the fixed lens barrel 5 by snap-fitting.

At this time, the output shaft 18a of the driving source 18 is clamped between the clamping members 19 and 20 attached to the fourth lens holding member 4.

FIG. 6 is a cross-sectional view showing the state in which the output shaft 18a is clamped between the clamping members 19 and 20. The clamping member 19 has two projecting shaft portions 19a and 19b, and the projecting shaft portion 19a is inserted through a hole 20a of the clamping member 20 and the coil spring 21. The respective end portions of the projecting shaft portions 19a and 19b are engaged with a hole portion 4a and a slot portion 4b which are formed in the fourth lens holding member 4, whereby the clamping members 19 and 20 and the coil spring 21 are secured to the fourth lens holding member 4.

FIGS. 7(a) and 7(b) show the engagement between the fourth lens holding member 4 and the clamping member 19. Since a notch is formed in the projecting shaft portion 19b of the clamping member 19 as shown in FIG. 7(a), the projecting shaft portion 19b enters the slot portion 4b when the clamping member 19 is at the position shown in FIG. 7(a). As the clamping member 19 is rotated through 90° (toward its operating position), the notch portion likewise rotates, so that the clamping member 19 becomes unable to come off the fourth lens holding member 4. When the clamping member 19 is rotated through 90°, an end face of the notch portion of projecting shaft portion 19b comes into abutment with a stopper 4b-1, so that the clamping member 19 is prevented from rotating beyond 90°. When the output shaft 18a is inserted into the gap between the clamping members 19 and 20, the urging force of the coil spring 21 works in the direction of the optical axis, so that looseness in the same direction is removed from the engagement between the clamping members 19 and 20 and the output shaft 18a. At the same time, looseness in the same direction can also be removed from the engagement between the clamping member 19 and the fourth lens holding member 4. Thus, the fourth lens holding member 4 can be moved by the movement of the output shaft 18a without looseness, so that the fourth lens holding member 4 can be rapidly stopped at a desired stop position with high precision.

FIGS. 8(a) and 8(b) are cross-sectional views (taken along line A—A) showing different shapes of the clamping portion of each of the clamping members 19 and 20. The clamping portion of each of the clamping members 19 and 20 may have an arcuate shape (FIG. 8(a)) or a partly projecting shape (FIG. 8(b)) as shown in cross section. With either shape, it is possible to reduce the area of contact between the output shaft 18a and the clamping members 19 and 20, thereby lowering the frictional load. Accordingly, since a far smoother motion can be realized at the clamping portions of the clamping members 19 and 20, the fourth lens holding member 4 can be moved to and stopped at a desired position with high precision at a high speed.

Figure 9:
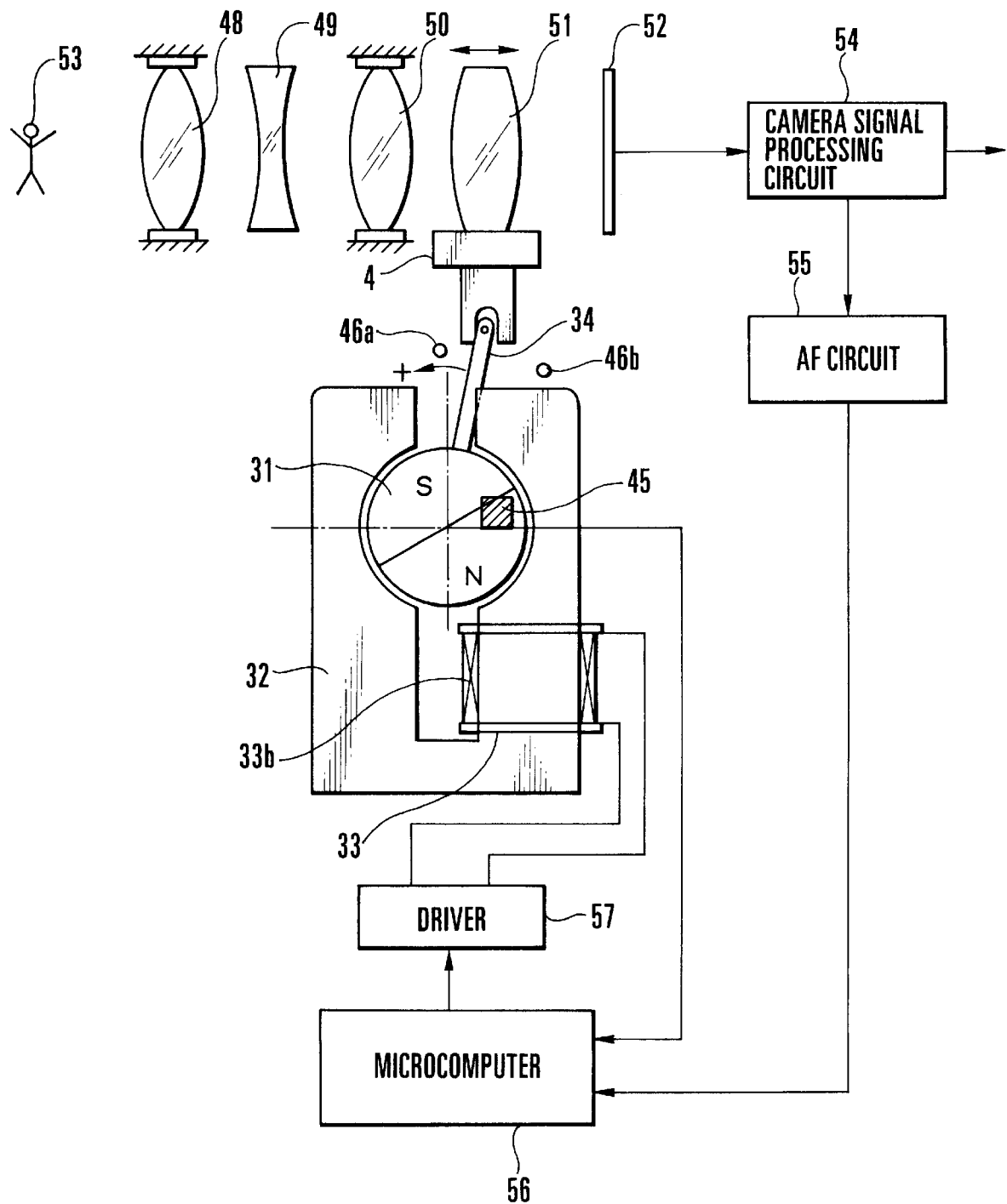
FIG. 9 is a schematic block diagram showing the principle of driving by the lens driving device shown in FIG. 1.

The principle of driving by the lens driving device according to the aforesaid embodiment will be described below. FIG. 9 is a schematic view showing the principle of driving by the lens driving device shown in FIG. 1. Light radiated from a subject 53 is made incident on the image pickup surface of an image pickup element 52 included in a camera body, by lens groups 48 to 51. An image of the subject 53, which has been thus formed on the image pickup surface, is photoelectrically converted by the image pickup element 52, and the resultant signal is outputted as an image signal. The image signal outputted from the image pickup element 52 is converted into a standardized video signal conforming to the NTSC system or the like by a camera signal processing circuit 54. The video signal is outputted from the camera signal processing circuit 54 and is also supplied to an AF circuit 55.

The AF circuit 55 extracts a high-frequency component from the video signal and performs focus detection on the basis of the level of the high-frequency component. Focus information indicative of the state of focus is outputted from the AF circuit 55 to a microcomputer 56 included in the camera body. The microcomputer 56 selects a driving speed for the focusing lens 51 on the basis of the focus information supplied from the AF circuit 55 and information supplied from a position detecting element 45 provided in the lens driving device, and inputs a signal indicative of the selected driving speed to a driver 57. The driver 57 supplies a predetermined driving voltage from which the selected driving speed can be obtained to a coil 33b of the bobbin 33, on the basis of the information supplied from the microcomputer 56. Thus, the stator 32 is excited to rotate the rotor 31, and the arm 34 connected to the rotor 31 turns so that the fourth lens holding member 4 provided with the focusing lens 51 moves toward its closest-distance end or its infinity end.

Figure 11A:
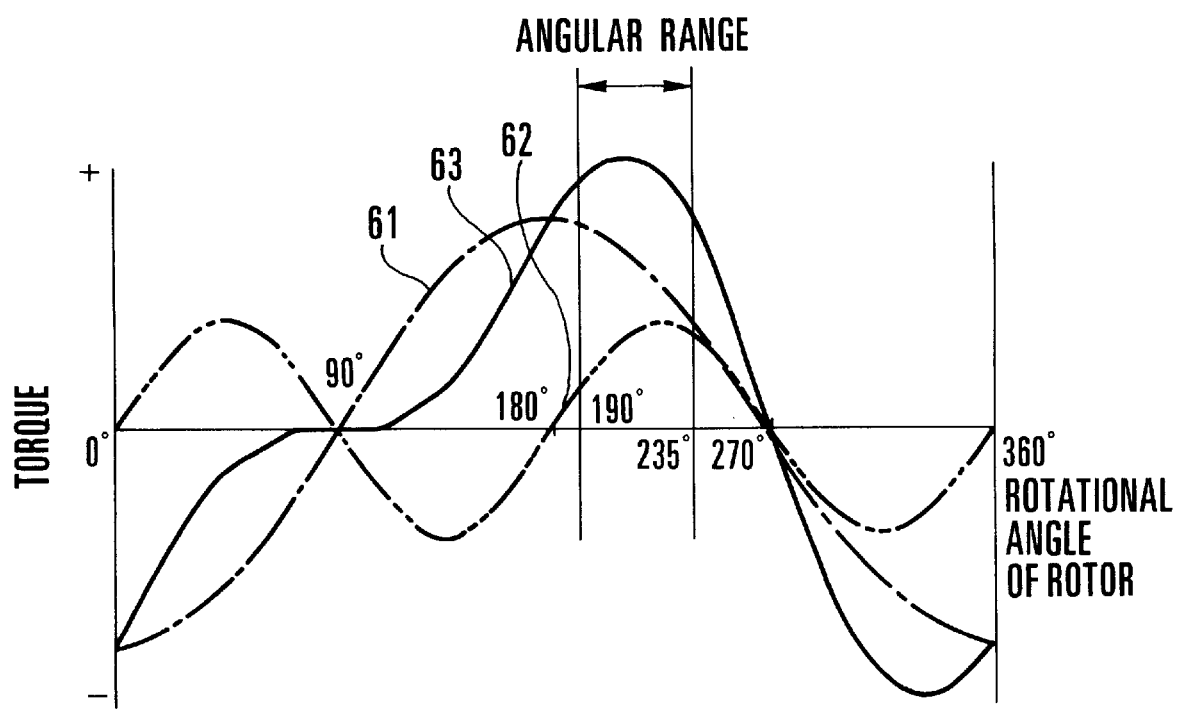
FIGS. 11(a) and 11(b) are charts of the torque characteristics obtained from the stator shape shown in FIG. 10(a)
Figure 11B:
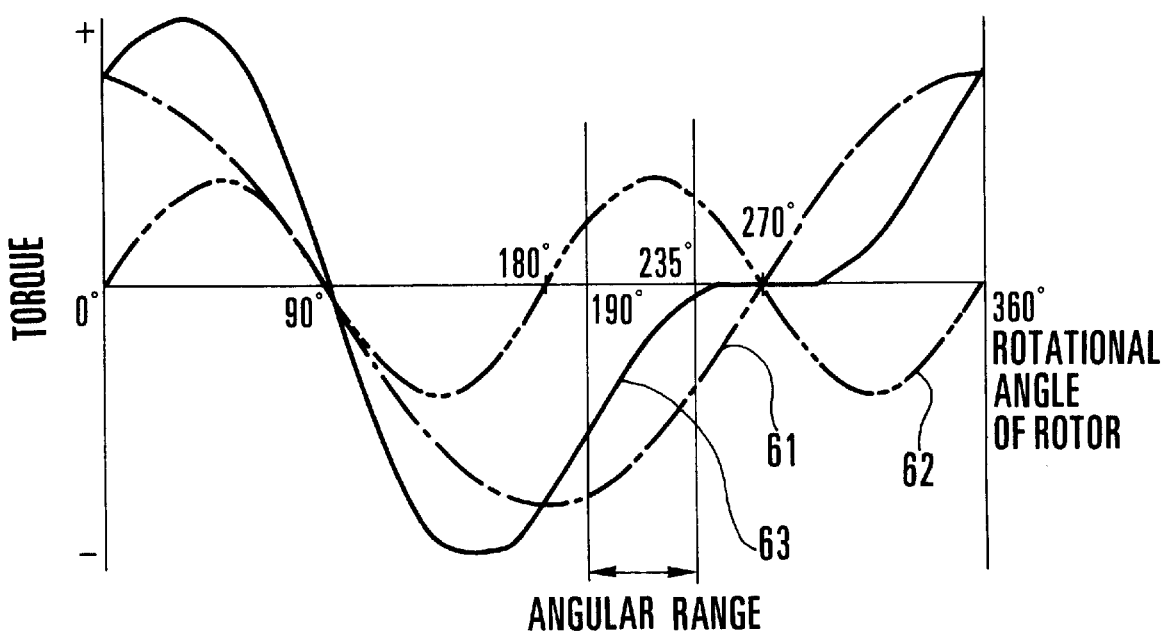

FIG. 11(a) shows the torque characteristics of the stator shape shown in FIG. 9(a) or 10(a). The shown torque characteristics are obtained by measuring torque characteristics under the condition that the angular position of the rotor 31 shown in FIG. 10(a) (a pole boundary line Z is perpendicular to the longitudinal direction of the stator 32 and the south pole is positioned on the side of the coil 33b) is an initial position (the rotational angle of the rotor 31 is 0°) and the rotor 31 is rotated counterclockwise through 360° by the supply of a constant electric current to the coil 33b (all torque characteristics which will be mentioned below are based on the same condition). In FIG. 11(a), a curve 61 indicates the torque generated in the rotor 31 by energizing the coil 33b (hereinafter referred to as the energization torque), a curve 62 indicates a cogging torque, and a curve 63 indicates the total torque of the energization torque 61 and the cogging torque 62, which is provided as an actual output (hereinafter referred to as the output torque). During non-energization, the output torque 63 and the cogging torque 62 are equal to each other. FIG. 11(b) shows the torque characteristics obtained when the aforesaid electric current of the same value was made to flow in the opposite direction.

Referring to the output torques 63 shown in FIGS. 11(a) and 11(b), if the coil 33b is energized in one direction, the rotor 31 rotates in one direction, whereas if the coil 33b is energized in the other direction, the rotor 31 rotates in the other direction. The angular range of the rotor 31 which rotates in this manner is, for example, between 190° and 235°. Accordingly, by setting stoppers 46a and 46b as rotation stoppers, as shown in FIG. 9, to employ such an angular range for lens driving, whenever the coil 33b is energized in one direction, the rotor 31 can be rotated in one direction, whereas whenever the coil 33b is energized in the other direction, the rotor 31 can be rotated in the other direction.

According to the lens driving device having the above-described construction, as can be seen from the torque characteristics shown in FIGS. 11(a) and 11(b), the cogging torque 62 shows a smooth continuous curve with respect to the rotational angle of the rotor 31, and the energization torque 61 also shows a smooth continuous curve with respect to the rotational angle of the rotor 31. As a matter of course, the output torque 63 shows a smooth continuous curve with respect to the rotational angle of the rotor 31. Accordingly, staircase-shaped torque ripples unique to stepping motors do not occur, so that smooth lens driving is enabled and vibration, noise or the like is substantially prevented. Unlike a stepping motor of the type which is started and stopped by the supply of a pulsed driving voltage, the rotor 31 is driven by a continuous voltage variation, so that the aforesaid lens driving device can smoothly respond to a driving instruction and achieve high-speed driving.

In addition, according to the above-described construction and arrangement, unlike stepping motors, it is not necessary to increase the number of magnetic poles in the small body of the rotor 31 to improve the stopping precision of the rotor 31. Accordingly, if a higher-precision position detector is employed, the stopping precision can be made higher.

Although in the above-described embodiment the driving source 18 is used in a focusing-lens part, a driving source having a similar construction and arrangement may, of course, be used in a zooming-lens part.

In the torque characteristics obtained from the stator shape adopted in the above-described embodiment, the cogging torque 62 is large compared to the energization torque 61, so that if the direction of energization of the coil 33b is reversed, the magnitude of the output torque 63 extremely varies for the same rotational angle of the rotor 31. For example, as can be seen from the angular range of rotor rotation (190° to 235°) for lens driving which has been adopted in the above-described embodiment, the magnitude of the output torque 63 when the rotor 31 driven in the other direction (FIG. 11(b)) is at a rotational angle of 190° is about five times that of the output torque 63 when the rotor 31 driven in the other direction is at a rotational angle 235° (FIG. 11(b)).

If the minimum output torque 63 required to drive the focusing lens 51 is set to the output torque 63 obtainable when the rotor 31 driven in the other direction is at a rotational angle of 235°, the output torque 63 produced when the rotor 31 is at a rotational angle of 190° becomes approximately five times as strong as the output torque 63 required to drive the focusing lens 51. Since the corresponding amount of current is consumed, efficiency is extremely low.

Figure 12A:
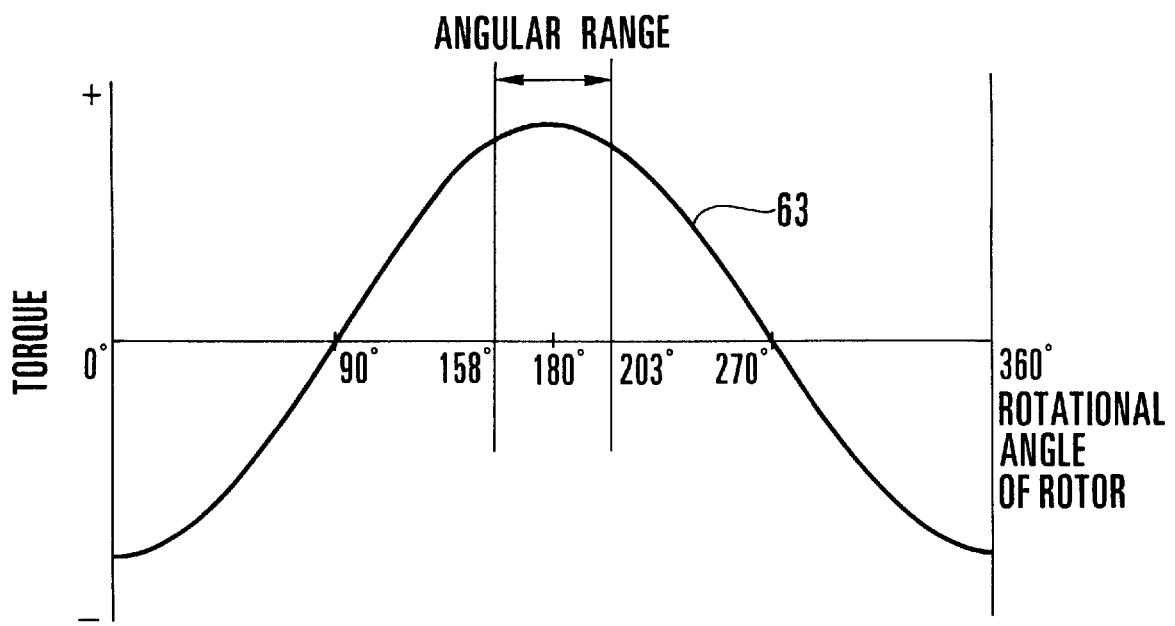
FIGS. 12(a) and 12(b) are charts of the torque characteristics obtained from the stator shape shown in FIG. 10(b)
Figure 12B:
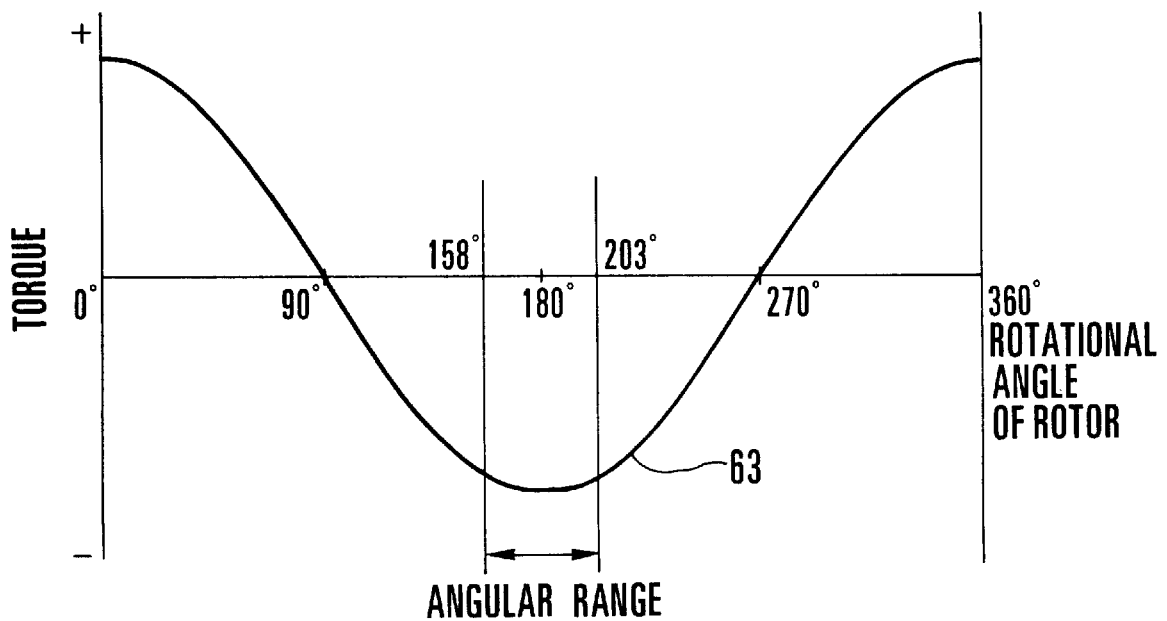

As described in Japanese Laid-Open Patent Application No. Hei 6-186613 as well, it is possible to vary the characteristic of the cogging torque 62 by providing a groove portion in the portion of a stator which is opposed to a rotor. For example, as shown in FIG. 10(b), groove portions 72 are respectively provided in the stator 32 at positions rotated through 90° from a gap 71 ($\theta_1$=90° in FIG. 10(b)) with a=b as viewed in FIG. 10(b). With this arrangement, it is possible to obtain the energization torque 61 as the output torque 63 free of a cogging torque, as shown in FIGS. 12(a) and 12(b). FIGS. 12(a) and 12(b) show torque characteristics which are respectively obtained when the coil 33b is energized in opposite directions.

In the case of such torque characteristics, if the angular range of rotor rotation used for lens driving is set to, for example, 158°–203°, the variation of the output torque 63 in that range becomes small and efficiency is improved over the stator shape shown in FIG. 10(a).

Meanwhile, it is to be noted that if there is no cogging torque, the lens driving device will lose the force required to hold a lens holding member. Specifically, the lens holding member which is not being energized is completely free, and if the camera body is shaken, not only does the lens holding member strike on a lens barrel or the like to produce noise, but the resultant impact or the like may also degrade optical characteristics. This problem can be solved by generating a predetermined cogging torque.

Figure 13A:
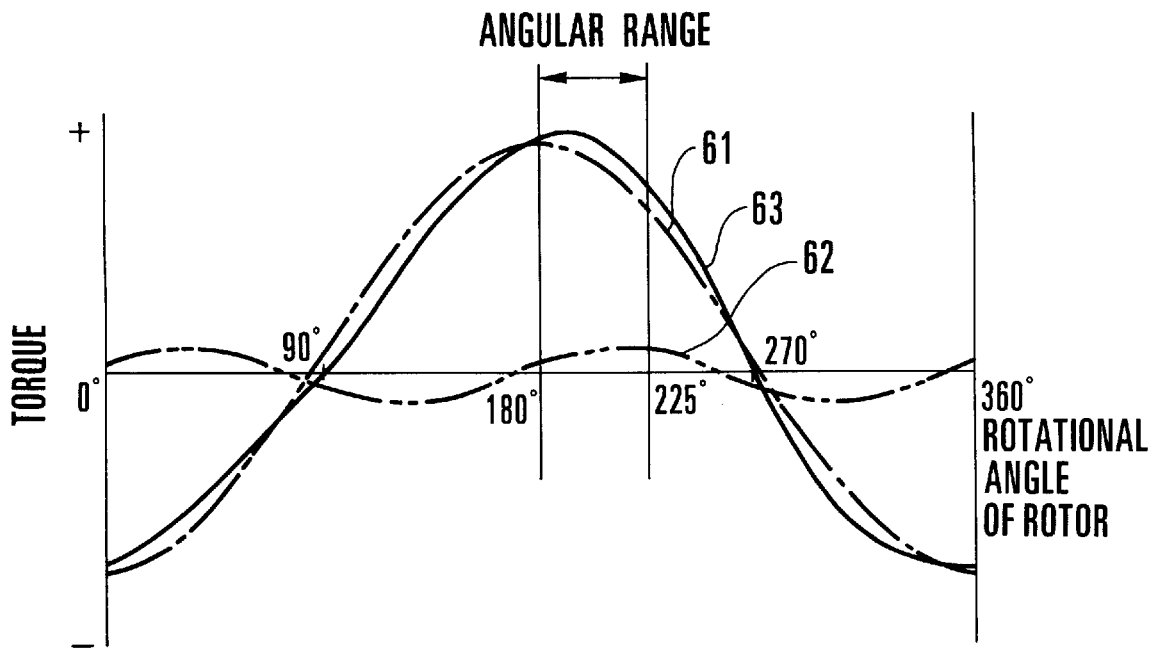
FIGS. 13(a) and 13(b) are charts of the torque characteristics obtained from the stator shape shown in FIG. 10(c)
Figure 13B:
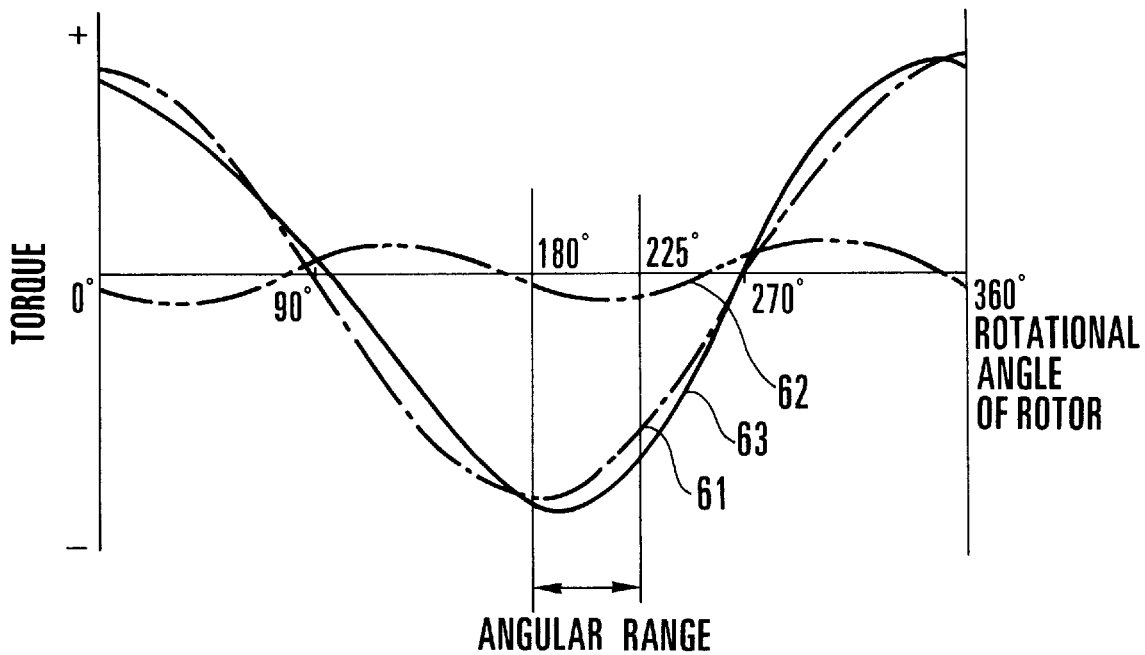

To solve these problems, groove portions 73 are respectively provided in the stator 32 at positions rotated through $\theta_2$ from the gap 71, i.e., at positions of 90°–several deg.<$\theta_2$<99° in FIG. 10(c), with a=b as viewed in FIG. 10(c). With this arrangement, it is possible to obtain a lens holding force for the lens holding member without greatly affecting the output torque 63, as shown in FIGS. 13(a) and 13(b). For example, if the angular range of rotor rotation used for lens driving is set to 180°–225°, it is possible to obtain a holding torque in the + direction at all times.

Incidentally, similar effects can also be obtained by providing the groove portions 73 at positions of 90°<$\theta_2$<90°+ several deg. FIGS. 13(a) and 13(b) show torque characteristics which are respectively obtained when the coil 33b is energized in opposite directions.

Figure 14:
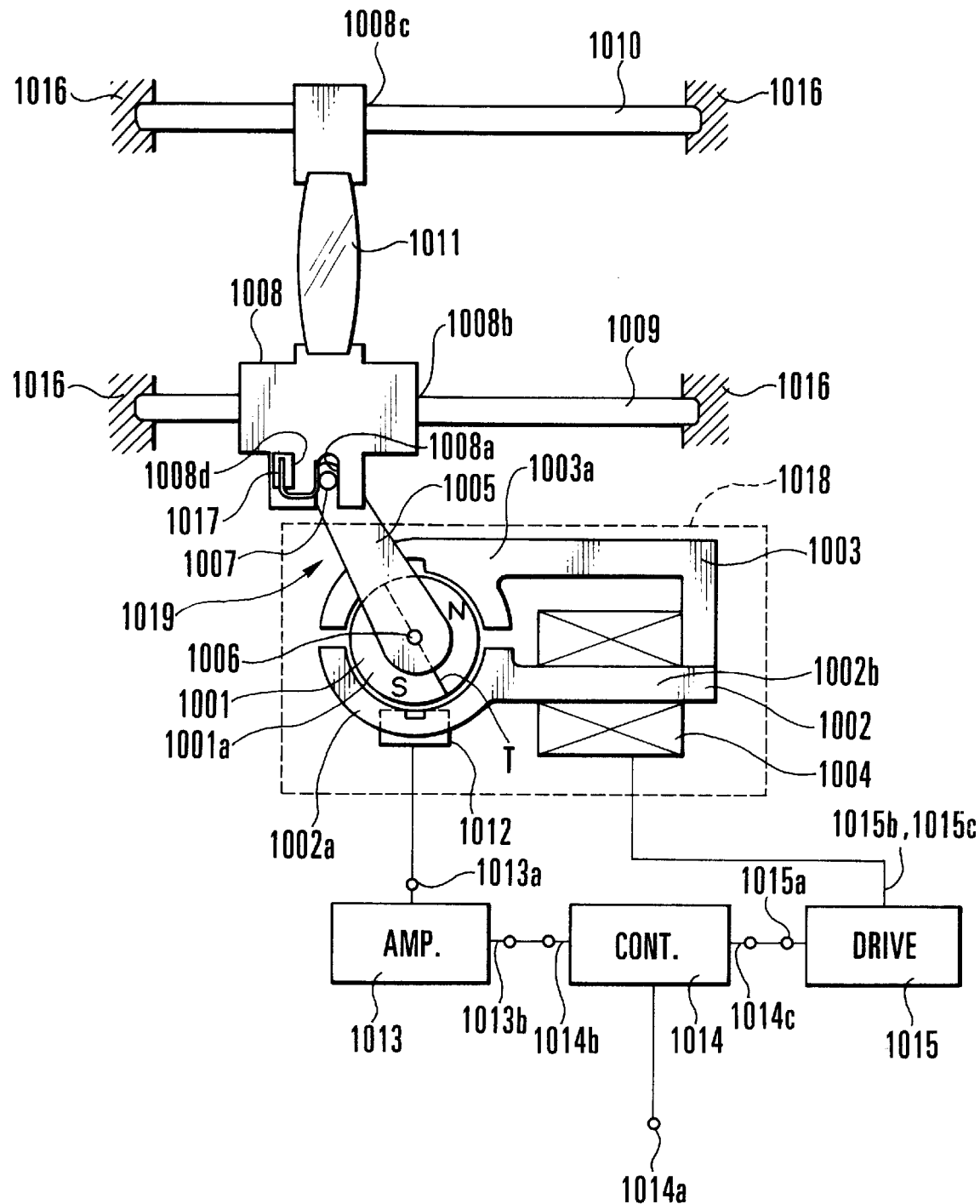
FIG. 14 is an explanatory view showing the construction of another embodiment of the present invention.

Another embodiment of the present invention will be described below with reference to FIGS. 14 through 17. FIG. 14 is an explanatory view showing an essential arrangement in which a lens driving device according to the present invention is applied to a zoom lens for use in a video camera or the like.

The essential arrangement shown in FIG. 14 includes a permanent magnet 1001, a first stator 1002, a second stator 1003, a coil 1004, an arm 1005 which is a constituent element of power converting means, a rotating shaft 1006, a slide shaft 1007, a lens barrel 1008 which is a driven object, first and second guide bars 1009 and 1010 which are guide means, a photographing lens 1011 which is a movable object, a Hall element 1012 which is rotational-position detecting means, an amplification circuit 1013 (first control means), a control circuit 1014 (second control means), a driving circuit 1015, a fixed lens barrel 1016 for holding the first and second guide bars 1009 and 1010, a spring 1017, a motor 1018 (driving source), and a rotor 1019 which is formed by the permanent magnet 1001, the arm 1005, the rotating shaft 1006 and the slide shaft 1007.

The permanent magnet 1001 is a neodymium-base plastic permanent magnet of cylindrical shape and has an outer-diameter portion magnetized to have two poles, and the magnetization waveform is sinusoidal. This sinusoidal two-pole magnetization waveform is obtained by preparing a permanent magnet having an inner diameter sufficiently smaller than an outer diameter and magnetizing the permanent magnet in a parallel magnetic field.

The first stator 1002 is made from, for example, laminated silicon steel sheets blanked by press working, and has a magnetic-pole portion 1002a, which is opposed to the permanent magnet 1001, and an extending portion 1002b.

The second stator 1003 is also made from, for example, laminated silicon steel sheets blanked by press working, and has a magnetic-pole portion 1003a opposed to the permanent magnet 1001.

The coil 1004 is formed by winding a copper wire around a hollow bobbin (not shown), and is fitted onto the extending portion 1002b of the first stator 1002. The arm 1005 is molded in, for example, polycarbonate resin, and is integrally provided with the rotating shaft 1006 and the slide shaft 1007. The permanent magnet 1001 is fixed to the rotating shaft 1006. The rotating shaft 1006 is turnably supported by a bearing of a case (not shown). The first stator 1002, the second stator 1003, the coil 1004 and the rotor 1019 constitute the motor 1018.

The lens barrel 1008 is molded in, for example, polycarbonate resin, and is provided with a first slide groove 1008a, a slide hole 1008b, a second slide groove 1008c and a spring engagement portion 1008d. The photographing lens 1011 is fixed to the lens barrel 1008. The slide shaft 1007 is fitted into the first slide groove 1008a of the lens barrel 1008, and the pressure spring 1017 is fixed to the spring engagement portion 1008d to urge the slide shaft 1007 against one side face of the first slide groove 1008a of the lens barrel 1008. The pressure spring 1017 is formed by pressing, for example, phosphor bronze.

A first guide bar 1009 is made of, for example, stainless steel, and is disposed parallel to the optical axis of the photographing lens 1011 and is fixed at its opposite ends to the lens barrel 1016 by press-fitting or other known means. The first guide bar 1009 is inserted through the slide hole 1008b of the lens barrel 1008 to support the lens barrel 1008 for movement back and forth in the longitudinal direction of the first guide bar 1009.

A second guide bar 1010 is made of, for example, stainless steel, and is disposed parallel to the optical axis of the photographing lens 1011 and is fixed at its opposite ends to the lens barrel 1016 by press-fitting or other known means. The second guide bar 1010 is inserted through the second slide groove 1008c of the lens barrel 1008 to support the lens barrel 1008 for movement back and forth in the longitudinal direction of the second guide bar 1010.

The Hall element 1012 is a known Hall element and is fixed to the case (not shown) in such a manner as to be opposed to the outer circumference of the permanent magnet 1001 with a slight clearance. The Hall element 1012 provides an output signal proportional to the magnetic flux density on the surface of the permanent magnet 1001.

The amplification circuit 1013 has input terminals 1013a connected to output terminals of the Hall element 1012, and amplifies the output signal of the Hall element 1012. The amplification circuit 1013 includes a circuit for supplying a bias voltage to the Hall element 1012.

The control circuit 1014 has a first input terminal 1014a, a second input terminal 1014b and an output terminal 1014c. The first input terminal 1014a is connected to, for example, a focus control circuit (not shown) of a video camera, and a voltage value corresponding to a target position of the photographing lens 1011 which is a movable object is supplied to the first input terminal 1014a as a control instruction signal. The second input terminal 1014b is connected to an output terminal 1013b of the amplification circuit 1013, and a voltage value corresponding to the current position of the photographing lens 1011 which is a movable object is supplied to the second input terminal 1014b. The control circuit 1014 amplifies the difference between the voltage value corresponding to the target position supplied to the first input terminal 1014a and the voltage value corresponding to the current position supplied to the second input terminal 1014b, and provides the amplified difference to the output terminal 1014c.

The driving circuit 1015 has an input terminal 1015a and first and second output terminals 1015b and 1015c. The input terminal 1015a is electrically connected to the output terminal 1014c of the control circuit 1014, and the first and second output terminals 1015b and 1015c are electrically connected to the coil 1004. If a voltage value applied to the input terminal 1015a is higher than a predetermined voltage, the driving circuit 1015 sets the voltage difference between the first output terminal 1015b and the second output terminal 1015c so that a voltage to be outputted from the first output terminal 1015b can be made higher than a voltage to be outputted from the second output terminal 1015c, and applies voltages proportional to the absolute value of the difference between the predetermined voltage and the voltage inputted to the input terminal 1015a to the coil 1004 via the respective first and second output terminals 1015b and 1015c.

If a voltage value applied to the input terminal 1015a is lower than the predetermined value, the driving circuit 1015 sets the voltage difference between the first output terminal 1015b and the second output terminal 1015c so that a voltage to be outputted from the first output terminal 1015b can be made lower than a voltage to be outputted from the second output terminal 1015c, and applies voltages proportional to the absolute value of the difference between the predetermined voltage and the voltage inputted to the input terminal 1015a to the coil 1004 via the respective first and second output terminals 1015b and 1015c. The amplification circuit 1013, the control circuit 1014 and the driving circuit 1015 constitute control means.

In this embodiment, having the above-described arrangement and construction, when an instruction signal corresponding to the target position of the lens barrel 1008 which is a driven object is supplied to the first input terminal 1014a of the control circuit 1014 as a voltage, the control circuit 1014 amplifies the difference between the instruction signal and the output signal of the Hall element 1012, and the driving circuit 1015 applies a sufficient voltage to clear the difference to "0" to the coil 1004 of the motor 1018. According to such a voltage, the rotor 1019 of the motor 1018 rotates up to a position at which the Hall element 1012 outputs a voltage value corresponding to the instruction signal. At this time, the rotation of the rotor 1019 is transmitted to the lens barrel 1008 via the arm 1005, and the lens barrel 1008 moves to a position corresponding to the instruction signal.

If the movement of the lens barrel 1008 has no linearity relative to the instruction signal, the position of the lens barrel 1008 becomes difficult to control. In this embodiment, however, since the permanent magnet 1001 is sinusoidally magnetized and the mounting angle between the arm 1005 and the Hall element 1012 is appropriately selected, the position of the lens barrel 1008 and the output voltage of the Hall element 1012 are imparted linearity, whereby the position of the lens barrel 1008 can be easily controlled.

The mounting angles of the permanent magnet 1001, the arm 1005 and the Hall element 1012 which suffice to impart linearity to the position of the lens barrel 1008 and the output voltage of the Hall element 1012 will be described below with reference to FIGS. 14 and 15($a$) to 15($c$).

In the embodiment shown in FIG. 14, the mounting direction of the arm 1005 coincides with the direction of a boundary T between the poles of the permanent magnet 1001. The Hall element 1012 is positioned so that it can oppose the boundary T between the poles of the permanent magnet 1001 when the arm 1005 is positioned at right angles to the longitudinal direction of the first and second guide bars 1009 and 1010.

The relationship among the output signal of the Hall element 1012, the rotational angle of the rotor 1019 and the position of the lens barrel 1008 will be described below with reference to FIGS. 15($a$) to 15($c$). In FIGS. 15($a$) to 15($c$), θ represents the rotational angle of the rotor 1019, "0" represents the position at which the arm 1005 makes right angles with the longitudinal direction of the first and second guide bars 1009 and 1010, "$e_{out}$" represents the output signal of the Hall element 1012, and "x" represents the position of the lens barrel 1008.

Since the permanent magnet 1001 is sinusoidally magnetized, the output voltage $e_{out}$ of the Hall element 1012 becomes sinusoidal with respect to the rotational angle θ of the rotor 1019, as shown in FIG. 15($a$). In addition, since the rotation of the slide shaft 1007 of the arm 1005 becomes equal to the longitudinal components of the first and second guide bars 1009 and 1010 owing to the arrangement and construction described previously with reference to FIG. 14, the position x of the lens barrel 1008 becomes sinusoidal with respect to the rotational angle θ of the rotor 1019, as shown in FIG. 15($b$).

Since the output voltage $e_{out}$ of the Hall element 1012 and the position x of the lens barrel 1008 become sinusoidal with respect to the rotational angle θ of the rotor 1019, the output voltage $e_{out}$ of the Hall element 1012 becomes linear with respect to the position x of the lens barrel 1008, as shown in FIG. 15($c$). Accordingly, the position of the lens barrel 1008 can be easily controlled on the basis of the output voltage $e_{out}$ of the Hall element 1012.

Figure 16:
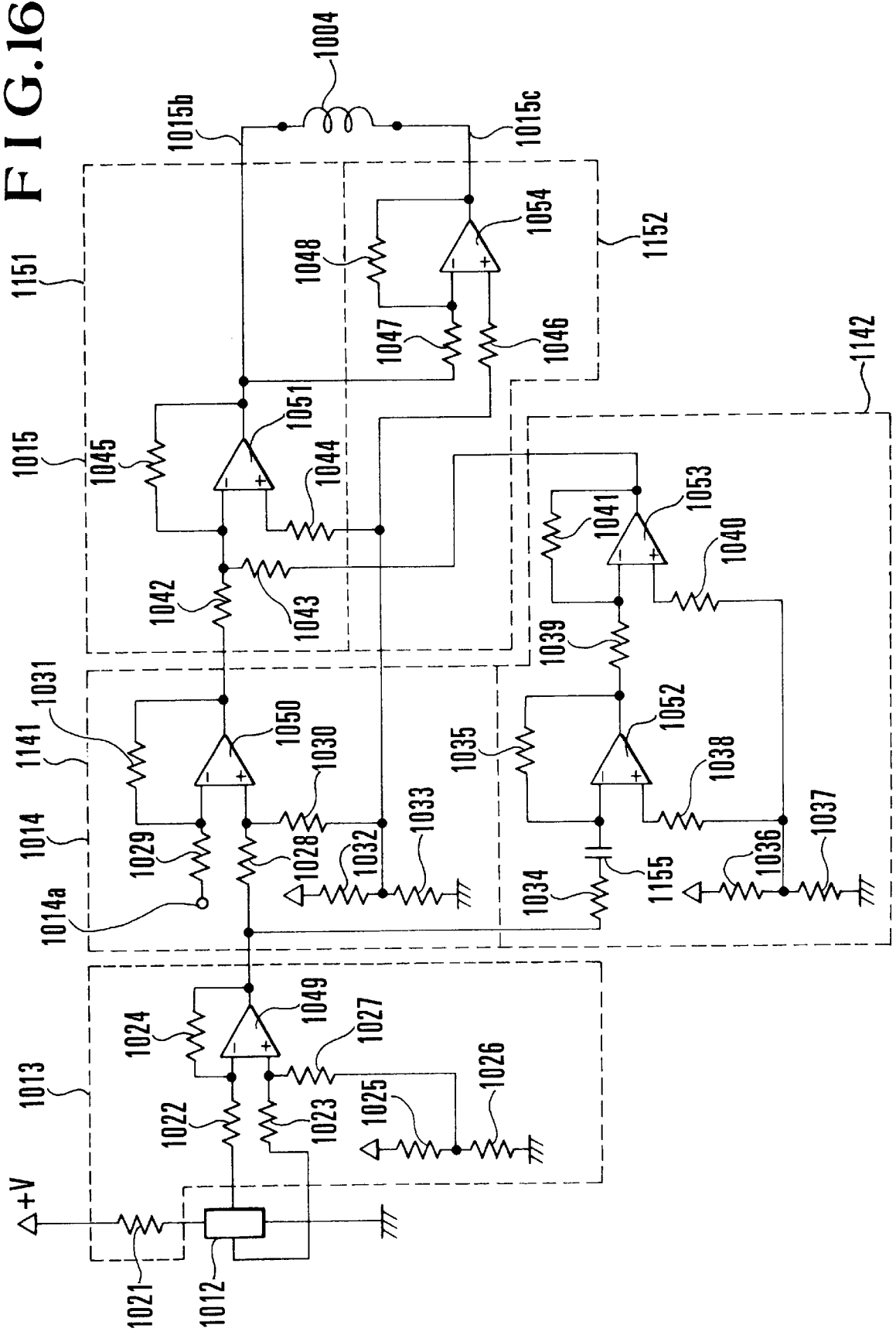
FIG. 16 is a circuit diagram of the driving circuit used in the embodiment shown in FIG. 14.

Specific constructions of the Hall element 1012, the amplification circuit 1013, the control circuit 1014 and the driving circuit 1015 which are included in this embodiment will be described below with reference to FIG. 16. In FIG. 16, reference numerals 1021 to 1048 denote resistors, reference numerals 1019 to 1054 denote operational amplifiers, and reference numeral 1155 denotes a capacitor.

The resistor 1021 is connected to a first input terminal of the Hall element 1012 and to a power source +V, and determines a bias current to flow through the Hall element 1012. Since the bias current to flow through the Hall element 1012 is a factor which determines the gain of the Hall element 1012, this gain is determined by the resistor 1021. The six resistors 1022 to 1027 and the operational amplifier 1049 constitute the known differential amplification circuit 1013, and first and second output terminals of the Hall element 1012 are respectively connected to first and second input terminals of the amplification circuit 1013. The resistors 1032 and 1033 are provided for producing a reference voltage.

The four resistors 1028 to 1031 and the operational amplifier 1050 constitute a known differential amplification circuit 1141. The first input terminal 1014$a$ of the differential amplification circuit 1141 which includes the operational amplifier 1050 is an input terminal of the lens driving device according to this embodiment, and is connected to an instruction signal generating device, such as an automatic focus detecting device used in a video camera. A second input terminal of the differential amplification circuit 1141 which includes the operational amplifier 1050 is connected to the output terminal of the amplifying circuit 1013 which includes the operational amplifier 1049. The differential amplification circuit 1141 which includes the operational amplifier 1050 amplifies the difference between an instruction signal given from the outside and the signal obtained by amplifying the output signal of the Hall element 1012 which corresponds to the rotational position of the rotor 1019.

The eight resistors 1034 to 1041, the capacitor 1155 and the operational amplifiers 1052 and 1053 constitute a speed signal amplifying circuit 1142. The input terminal of the speed signal amplifying circuit 1142 is connected to the output terminal of the amplifying circuit 1013 which includes the operational amplifier 1049 for amplifying the output signal of the Hall element 1012. The speed signal amplifying circuit 1142 amplifies the variation of the output signal of the Hall element 1012 which represents the rotational speed of the rotor 1019.

The four resistors 1042 to 1045 and the operational amplifier 1051 constitute a known amplification circuit 1151. The input terminal of the amplification circuit 1151 is connected to the output terminal of the differential amplification circuit 1141 which includes the operational amplifier 1050, i.e., a first output terminal of the control circuit 1014, and to the output terminal of the speed signal amplifying circuit 1142, i.e., a second output terminal of the control circuit 1014. The amplification circuit 1151 which includes the operational amplifier 1051 outputs a voltage relative to a reference voltage which corresponds to an instruction signal and a deviation of the position of the lens barrel 1008 as well as the rotational speed of the rotor 1019.

The three resistors 1046 to 1048 and the operational amplifier 1054 constitute a known inverting amplifying circuit 1152. A first input terminal of the inverting amplifying circuit 1152 is connected to the output terminal of the amplification circuit 1151 which includes the operational amplifier 1051, and the inverting amplifying circuit 1152 inverts the output voltage of the amplification circuit 1151, which includes the operational amplifier 1051, with respect to the reference voltage and outputs the resultant inverted voltage. The output terminal of the amplification circuit 1151 which includes the operational amplifier 1051 is the first output terminal 1015$b$ of the driving circuit 1015 which is connected to a first end of the coil 1004, and the output terminal of the inverting amplifying circuit 1152 which includes the operational amplifier 1054 is the second output terminal of the driving circuit 1015 which is connected to a second end of the coil 1004.

The lens driving device according to this embodiment having the above-described arrangement and construction is capable of accurately driving the lens barrel 1008 which is a driven object, in accordance with an instruction signal.

In the case of the above-described embodiment, when the lens barrel 1008 is to be driven by the lens driving device according to this embodiment, it is desirable to set the gain of the driving circuit so that a sufficient electric current to drive a load, such as the weight of the lens barrel 1008, can flow through the coil 1004 of the motor 1018 when the photographing lens is moved along the optical axis by only a value which allows the amount of focus deviation at a focal point to become not more than half of the diameter of an allowable circle of confusion. With this setting, it is possible to provide a sharply focused image.

Figure 17:
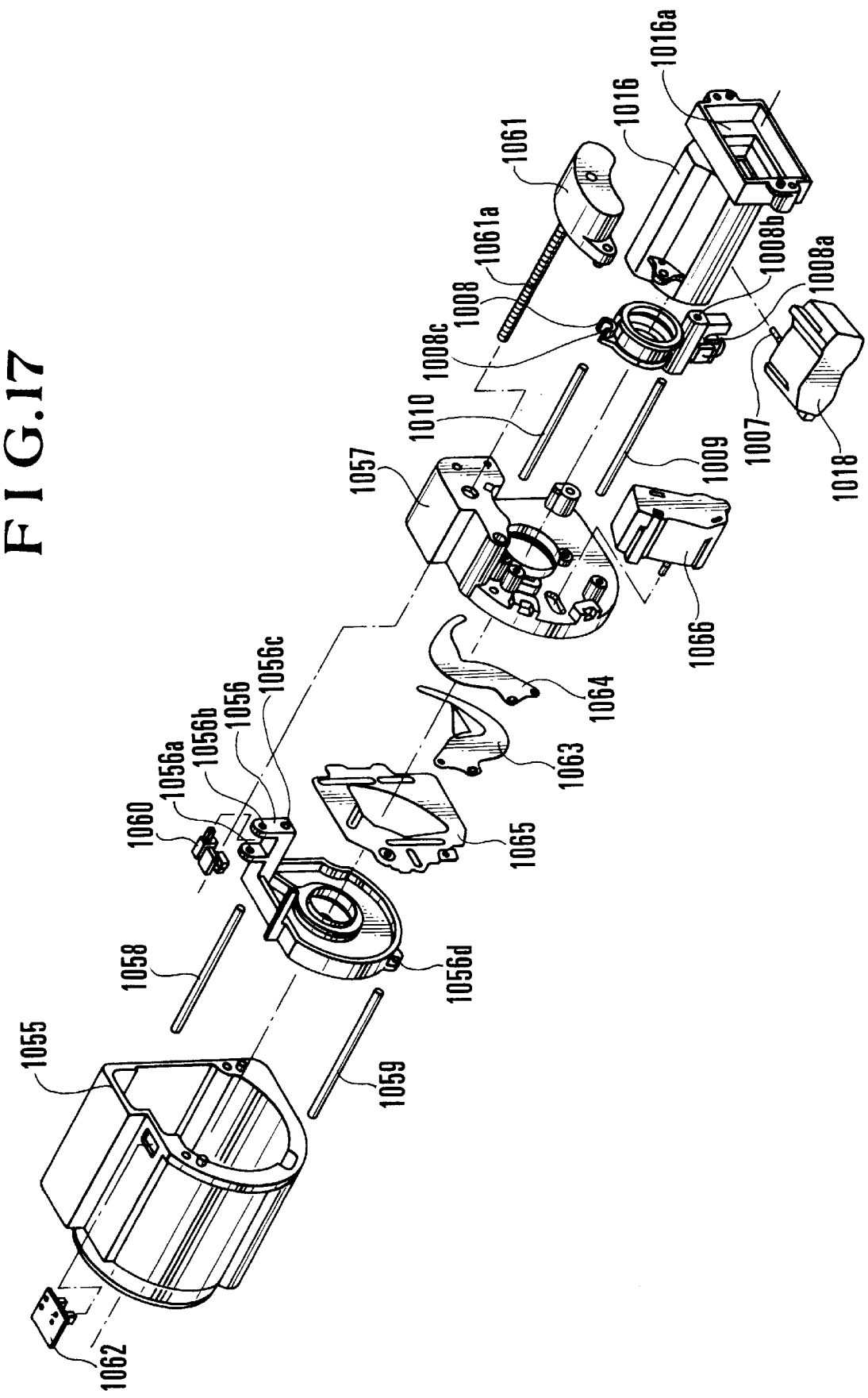
FIG. 17 is an exploded perspective view of a lens barrel to which the embodiment shown in FIG. 14 is applied.

FIG. 17 is an exploded perspective view showing a lens barrel assembly in which the above-described embodiment is applied to the driving of the zoom lens of a video camera. In FIG. 17, identical reference numerals are used to denote constituent elements substantially identical to those shown in FIG. 14, and the description thereof is omitted for the sake of simplicity. The lens barrel assembly shown in FIG. 17 includes a first fixed lens barrel 1055 to which a first fixed lens group is fixed, a first movable lens barrel 1056 to which a zooming lens is fixed, a second fixed lens barrel 1057 to which a second fixed lens group is fixed, and first and second guide bars 1058 and 1059 for the zooming lens. The first and second guide bars 1058 and 1059 are fixed to the first and second fixed lens barrels 1055 and 1057, and are respectively inserted through a slide hole 1056c and a slide groove 1056d which are formed in the first movable lens barrel 1056, thereby supporting the first movable lens barrel 1056 for movement back and forth along the optical axis.

A stepping motor 1061 has an output shaft formed as a screw shaft 1061a. A rack member 1060 is fitted into mounting holes 1056a and 1056b formed in the first movable lens barrel 1056, and the rack portion of the rack member 1066 is meshed with the screw shaft 1061a of the stepping motor 1061. A reset sensor 1062 is provided for resetting the position of the first movable lens barrel 1056. In the above-described arrangement and construction, the zooming lens (the first movable lens barrel 1056) is moved back and forth along the optical axis by the rotation of the stepping motor 1061.

The shown lens barrel assembly includes iris blades 1063 and 1064, a pressure plate 1065 for restricting the positions of the iris blades 1063 and 1064, an iris driving motor 1066 which rotationally drives the iris blades 1063 and 1064 to cause them to open and close, the third fixed lens barrel 1016, and the second movable lens barrel 1008 to which a focusing and compensation lens is fixed.

The first and second guide bars 1009 and 1010 for the focusing and compensation lens are fixed to the second fixed lens barrel 1057 and the third fixed lens barrel 1016, and are respectively inserted through the slide hole 1008b and the second slide groove 1008c of the second movable lens barrel 1008, thereby supporting the second movable lens barrel 1008 for movement back and forth along the optical axis. The motor 1018 is fixed to the third fixed lens barrel 1016, and the output shaft 1007 is fitted into the first slide groove 1008a of the second movable lens barrel 1008, so that the second movable lens barrel 1008 is moved back and forth along the optical axis by the rotation of the motor 1018.

With the lens barrel assembly having the above-described arrangement and construction, it is possible to achieve silent, rapid and accurate driving of a zoom lens.

Although in the above-described embodiment the magnetization waveform of the permanent magnet 1001 is sinusoidal, there is also a case in which the magnetization waveform of a permanent magnet is not sinusoidal, for example, for the reason that the permanent magnet is relatively larger in inner diameter than in outer diameter. Even in such a case, a lens driving device according to another embodiment, which will be described below, is capable of accurately controlling the position of a driven object. This embodiment will be described below with reference to FIGS. 18 and 19(a) to 19(c).

Figure 18:
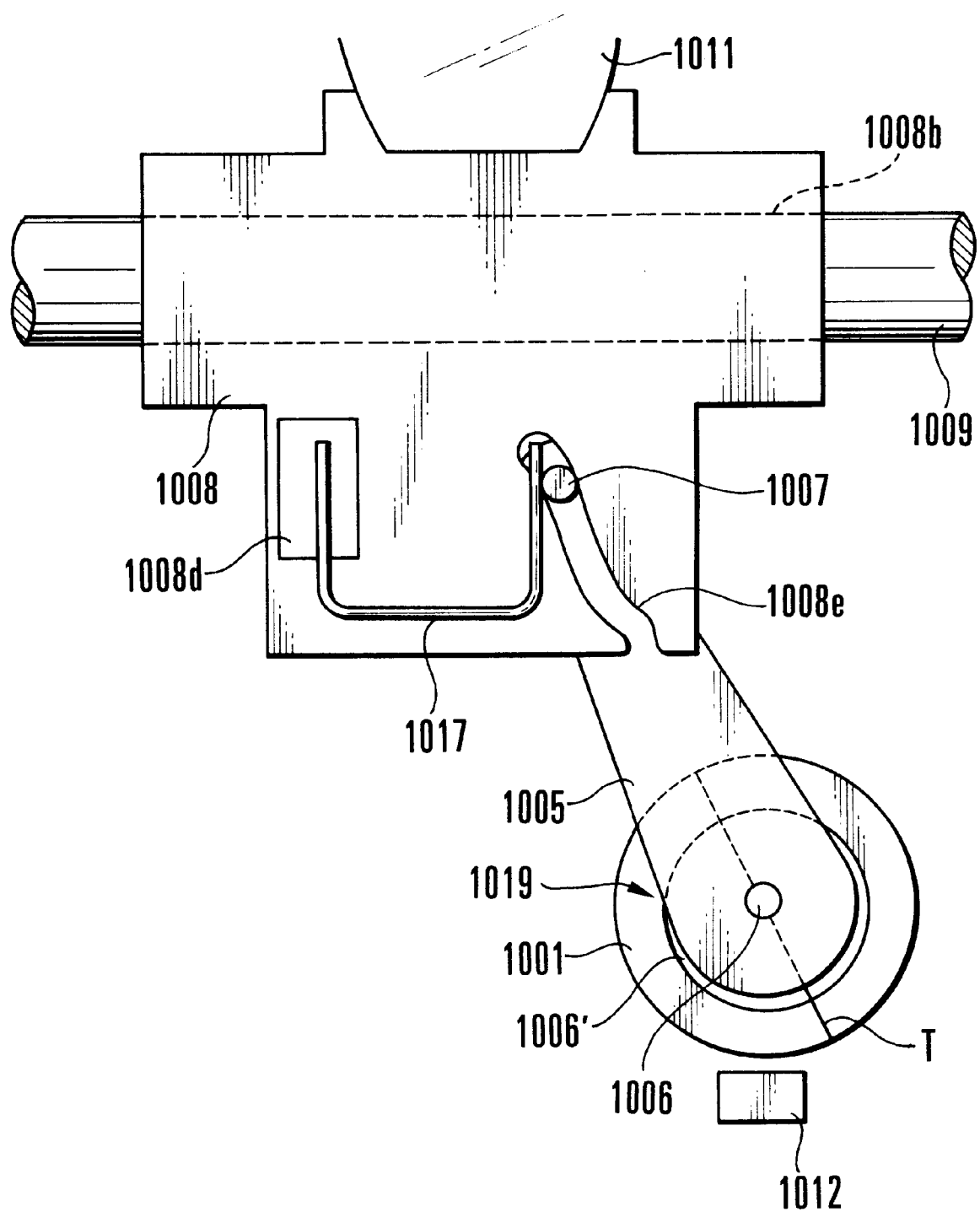
FIG. 18 is a schematic explanatory view of an essential portion of another embodiment of the present invention.

FIG. 18 is an enlarged view of an essential portion of this embodiment of the present invention. The embodiment shown in FIG. 18 is substantially identical to the embodiment shown in FIG. 14 except for a coupling portion for providing coupling between a driven object and a rotor. Accordingly, in FIG. 18, identical reference numerals are used to denote constituent elements substantially identical to those shown in FIG. 14, and a description thereof is omitted for the sake of simplicity.

Referring to FIG. 18, the permanent magnet 1001 has a cylindrical shape the surface of which is magnetized to show a so-called trapezoidal waveform. The rotating shaft 1006 is rotatably supported at its opposite small-diameter end portions by bearings provided in a case (not shown), and the permanent magnet 1001 is fixed to the central large-diameter portion of the rotating shaft 1006, as by press-fitting. The arm 1005 is mounted to extend in the direction of the boundary of the magnetization of the permanent magnet 1001, and the tip portion of the arm 1005 is provided with the slide shaft 1007.

The rotating shaft 1006, the arm 1005 and the slide shaft 1007 are integrally formed by plastic molding, and constitute the rotor 1019 which is a rotating object, together with the permanent magnet 1001.

The lens barrel 1008 is a driven object, and the photographing lens 1011 is fixed to the lens barrel 1008. The lens barrel 1008 is supported for movement back and forth along the optical axis by the guide bar 1009 inserted through the slide hole 1008b. The lens barrel 1008 has a first slide groove 1008e of curved shape. The curved shape of the first slide groove 1008e is selected so that the movement of the lens barrel 1008 may be linear with respect to the rotational angle of the rotor 1019 when the rotor 1019 rotates from a starting point, i.e., a rotational position at which the arm 1005 is perpendicular to the guide bar 1009. Specifically, the curved shape of the first slide groove 1008e is selected so that the position x of the lens barrel 1008 may be x=A×θ (A is an arbitrary constant) with respect to the rotational angle θ of the rotor 1019. When the arm 1005 is perpendicular to the guide bar 1009, the Hall element 1012 opposes the boundary T between the poles of the permanent magnet 1001 with a slight clearance remaining between the Hall element 1012 and the permanent magnet 1001. The pressure spring 1017 is fixed at one end to the spring engagement portion 1008d of the lens barrel 1008 and, at the other end, urges the slide shaft 1007 against one end face of the first slide groove 1008e of the lens barrel 1008.

Figure 19A:
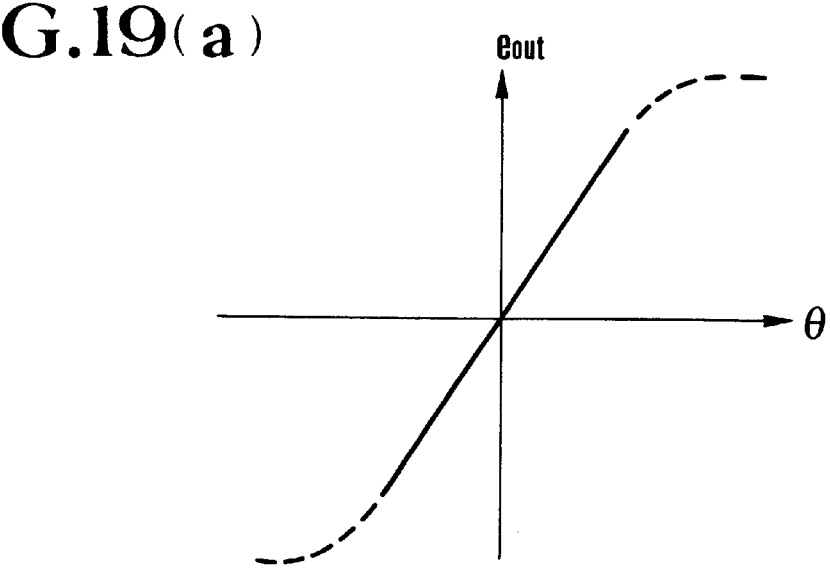
FIGS. 19(a), 19(b) and 19(c) are views showing the position of a driven object and the output signal of rotational position detecting means in the embodiment shown in FIG. 18.
Figure 19B:
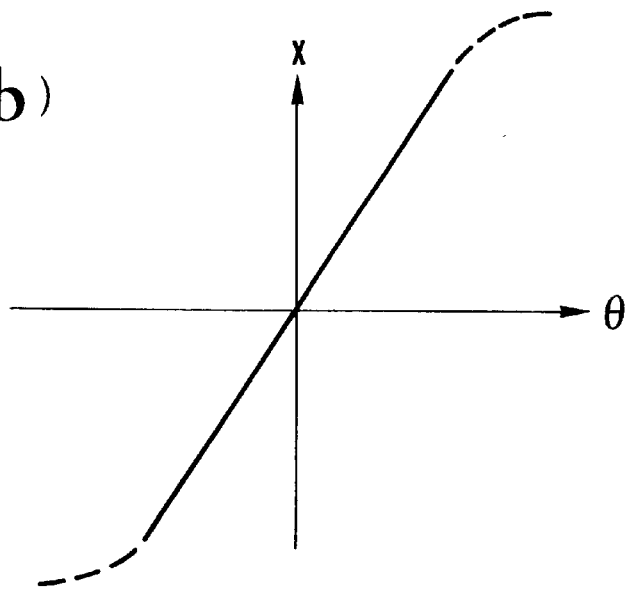
Figure 19C:
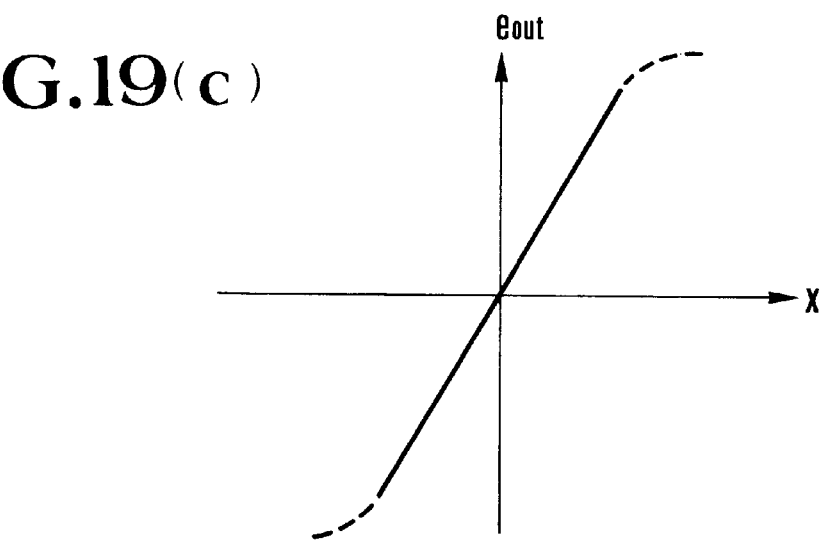

The operation of the embodiment having the above-described arrangement and construction will be described below with reference to FIGS. 19(a), 19(b) and 19(c). In FIGS. 19(a) to 19(c), θ represents the rotational angle of the rotor 1019 from a starting point which is the rotational position of the rotor 1019 at which the arm 1005 is perpendicular to the guide bar 1009, "$e_{out}$" represents the voltage outputted from the Hall element 1012 when the boundary T between the poles of the permanent magnet 1001 opposes the Hall element 1012, and "x" represents the position of the lens barrel 1008 with respect to the rotational angle θ of the rotor 1019 from the starting point, i.e., the rotational position of the rotor 1019 at which the arm 1005 is perpendicular to the guide bar 1009.

Since the magnetic flux density on the outer circumferential portion of the permanent magnet 1001 exhibits a trapezoidal waveform with respect to the angle, the output voltage $e_{out}$ of the Hall element 1012 becomes linear with respect to the rotational angle θ of the rotor 1019, as shown in FIG. 19(*a*). In addition, since the first slide groove 1008*e* of the lens barrel 1008 has a shape which causes the lens barrel 1008 to move linearly with respect to the rotational angle θ of the rotor 1019 as described previously, the position x of the lens barrel 1008 becomes linear with respect to the rotational angle θ of the rotor 1019, as shown in FIG. 19(*b*). Since both the output voltage $e_{out}$ of the Hall element 1012 and the position x of the lens barrel 1008 become linear with respect to the rotational angle θ of the rotor 1019, the output voltage $e_{out}$ of the Hall element 1012 also becomes linear with respect to the position x of the lens barrel 1008. In other words, it is possible to obtain the output voltage $e_{out}$ of the Hall element 1012 proportional to the position x of the lens barrel 1008, so that the position x of the lens barrel 1008 which is a driven object can be easily controlled. According to the embodiment having the above-described arrangement and construction, it is possible to provide accurate position control irrespective of the magnetization waveform of the permanent magnet 1001.

Although in each of the above-described two embodiments the rotor 1019 having the permanent magnet 1001 is also used as the rotor of a driving power source, the lens driving device may also be driven by using power obtainable from a separate power source. Another embodiment using the separate power source will be described below with reference to FIGS. 20(*a*) and 20(*b*).

Figure 20A:
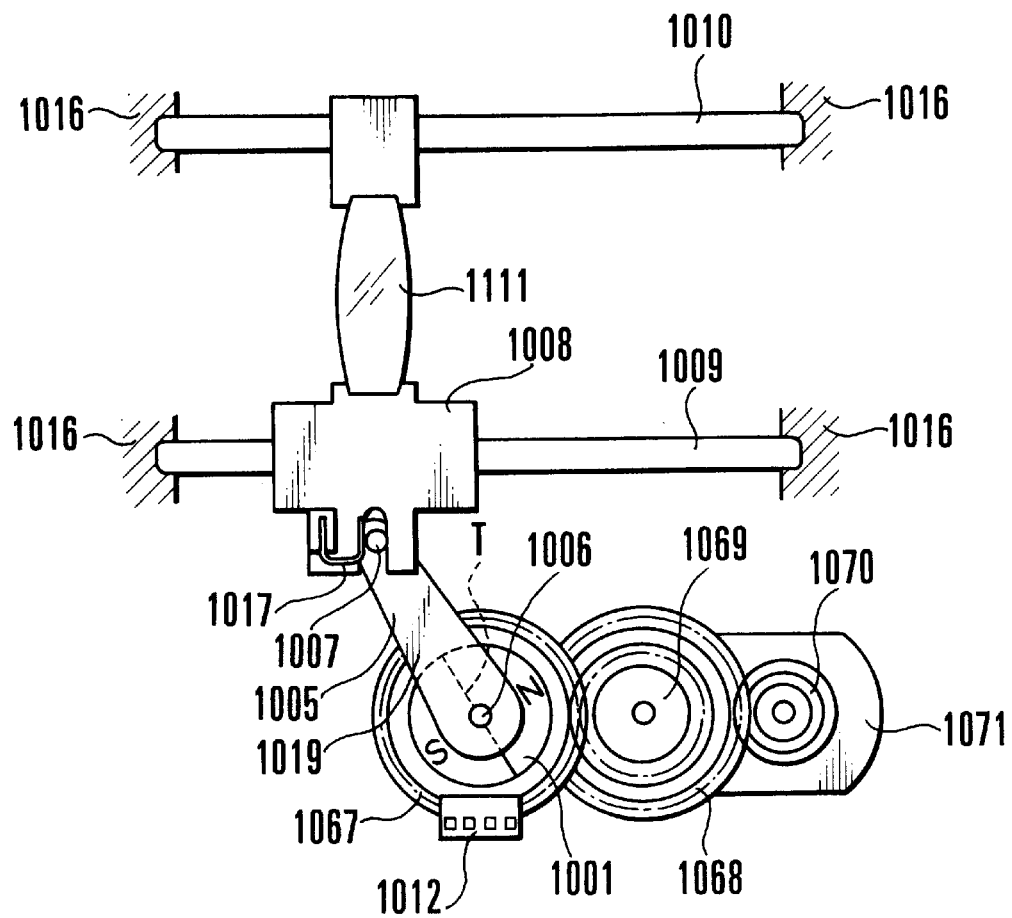
FIGS. 20(a) and 20(b) are schematic explanatory views showing the construction of another embodiment of the present invention in front elevation and in side elevation, respectively.
Figure 20B:
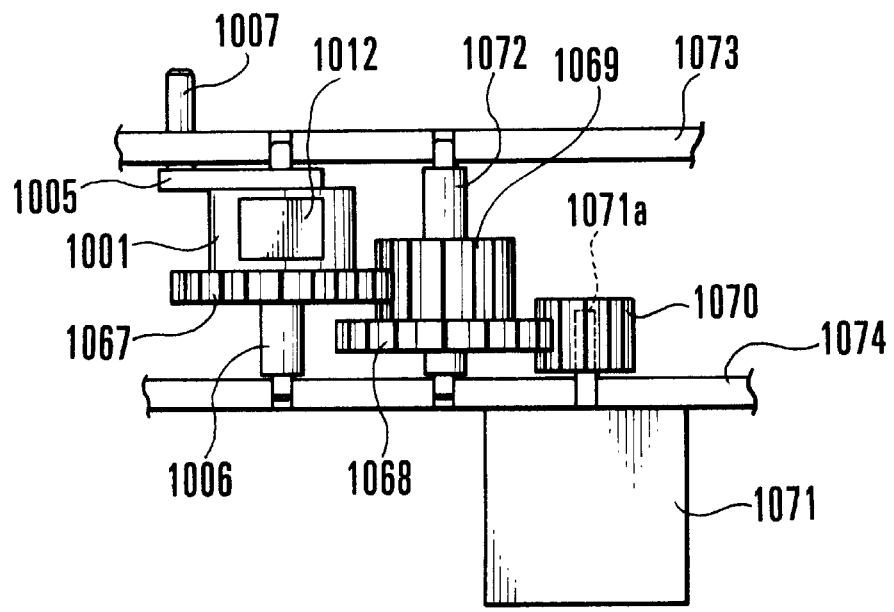

FIG. 20(*a*) is a front elevational view of this embodiment, and FIG. 20(*b*) is a side elevational view of the embodiment. In FIGS. 20(*a*) and 20(*b*), identical reference numerals are used to denote constituent elements substantially identical to those used in either of the embodiments shown in FIGS. 14 and 18, and the description thereof is omitted for the sake of simplicity. The shown embodiment includes gears 1067, 1068, 1069 and 1070 molded in a material having a high slidability, such as polyacetal resin, a known direct-current motor 1071, a rotating shaft 1072, and base plates 1073 and 1074.

The rotor 1019 includes the permanent magnet 1001 of cylindrical shape, the arm 1005, the rotating shaft 1006, the slide shaft 1007 and the gear 1067. The arm 1005, the rotating shaft 1006 and the slide shaft 1007 are integrally formed, and the permanent magnet 1001 and the gear 1067 are fixed to the rotating shaft 1006 by known means such as press-fitting. The Hall element 1012 is disposed so that it can oppose the boundary T between the poles of the permanent magnet 1001 when the arm 1005 is perpendicular to the guide bar 1009.

The gears 1068 and 1069 are integrally formed, and fixed to the rotating shaft 1072 by known means such as press-fitting. The gear 1070 is fixed to an output shaft 1071*a* of the motor 1071 by known means such as press-fitting. The respective base plates 1073 and 1074 rotatably support the rotating shafts 1006 and 1072. The Hall element 1012 is fixed to the base plate 1073 by fixing means (not shown), and the direct-current motor 1071 is fixed to the base plate 1074. The gear 1067 fixed to the rotating shaft 1006 is meshed with the gear 1069, and the gear 1068, which rotates integrally with the gear 1069, is meshed with the gear 1070.

In the above-described arrangement and construction, the rotation of the motor 1071 is transmitted to the rotor 1019 via the four gears 1067 to 1070, whereby the lens barrel 1008 which is a driven object is moved back and forth along the optical axis by the rotation of the rotor 1019. The Hall element 1012 outputs a voltage value corresponding to the position of the lens barrel 1008, for example, by a method utilizing the sinusoidally magnetized permanent magnet 1001 used in the embodiment shown in FIG. 14 or by a method utilizing the lens barrel 1008 having the slide groove 1008*e* which has a novel cam shape such as that used in the embodiment shown in FIG. 18.

According to the above-described arrangement and construction, the driving circuit described above with reference to FIG. 16 can be used without modification.

In this embodiment, the direct-current motor is employed as a driving power source, and its torque is amplified through the gears so that it can be used to drive the lens barrel 1008 which is a driven object. Accordingly, since the lens barrel 1008 which is a driven object can be driven with a strong force, the above-described embodiment is particularly suited to a heavy-weight driven object.

If a driven object such as a photographing lens is to be driven by a driving device, it may become necessary to vary the position and amount of driving of the driven object according to conditions such as temperature. Another embodiment, arranged to vary with temperature the position and amount of driving of a driven object by a lens driving device to which the driving device according to the present invention is applied, will be described below with reference to FIGS. 21(*a*) to 21(*c*) and 22.

Figure 21A:
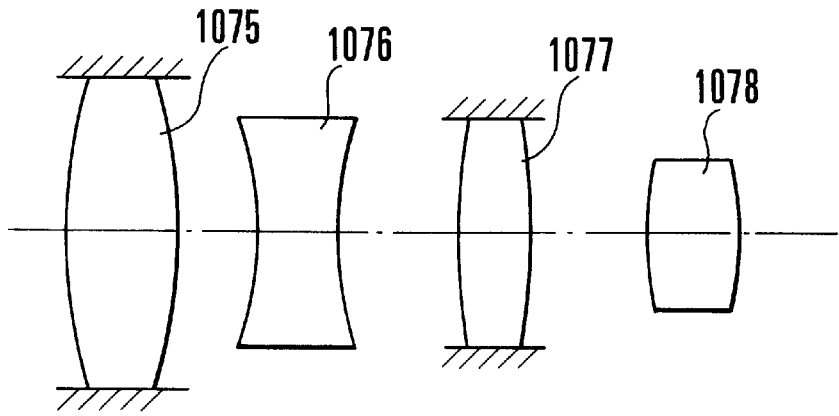
FIGS. 21(a), 21(b) and 21(c) are explanatory views of the operation of another embodiment of the present invention.
Figure 21B:
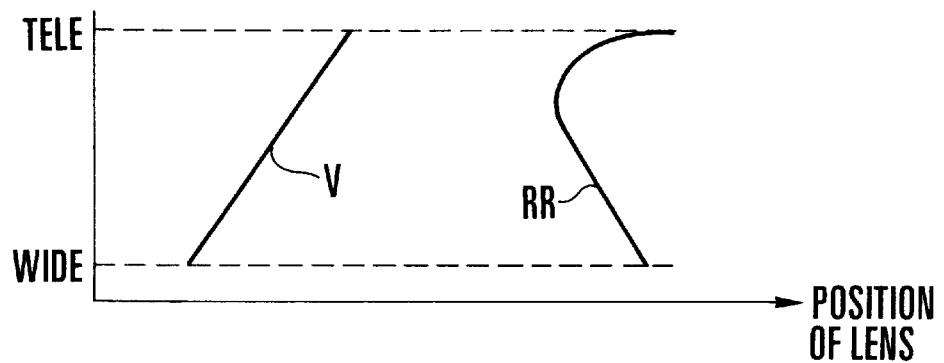

FIGS. 21(*a*) to 21(*c*) are explanatory views aiding in explaining the operation of the lens driving device which is arranged to vary its driving characteristics, i.e., the position and amount of driving of the driven object, according to temperature. FIG. 22 is a circuit diagram of a circuit for varying with temperature the driving characteristics of the lens driving device, i.e., the position and amount of driving of the driven object.

FIG. 21(*a*) shows the optical system of a zoom lens for use in a video camera. The optical system includes a first fixed lens 1075, a zooming lens 1076 which is capable of moving back and forth along the optical axis, a second fixed lens 1077 which is molded in a plastic material, and a focusing and compensation lens (hereinafter referred to as the RR lens) 1078 which is molded in a plastic material and is capable of moving back and forth along the optical axis.

In the zoom lens of the video camera having the aforesaid optical system, it is common practice to drive the zooming lens 1076 and the RR lens 1078 by means of independent actuators. During driving, to correct focus deviation due to zooming, for example, if a subject is located at infinity, the zooming lens 1076 and the RR lens 1078 must move between the wide-angle end and the telephoto end of the optical system while retaining the relationship represented by the characteristics V and RR shown in FIG. 21(*b*). This system is called an "electronic cam", and the positional relation of each of the zooming lens 1076 and the RR lens 1078 is called an "electronic cam locus".

If the second fixed lens 1077 and the RR lens 1078 are formed of a plastic material, the respective focal lengths of the second fixed lens 1077 and the RR lens 1078 vary with temperature because the index of refraction of the plastic material varies with temperature. For this reason, in this embodiment, the variations of the focal lengths of these lenses due to temperature are corrected by varying, according to temperature, the position and amount of driving of a photographing lens which is a movable object, i.e., the RR lens 1078 in this embodiment.

The mechanical construction of the driving device according to this embodiment is identical to the mechanical construction of the embodiment shown in FIGS. 14 to 16, and the position and the amount of driving of the RR lens 1078 are varied according to temperature by the amplifying circuit 1013 shown in FIG. 14.

FIG. 22 is a circuit diagram showing the amplifying circuit 1013 used in this embodiment. The amplifying circuit 1013 includes, in addition to the constituent elements used in the embodiment shown in FIGS. 14 to 16, thermally sensitive resistors 1079 and 1080 each of which has the characteristics that as the ambient temperature becomes higher, its resistance value becomes higher at a predetermined ratio.

The thermally sensitive resistor 1079 is connected to an input terminal of the Hall element 1012, and determines a bias current to be supplied to the Hall element 1012. For example, if the ambient temperature rises and the resistance value of the thermally sensitive resistor 1079 rises, the bias current to be supplied to the Hall element 1012 decreases and the sensitivity of the Hall element 1012 lowers. Accordingly, the amount of movement of a lens increases with respect to the same instruction signal applied to the input terminal of the driving device. Specifically, if the ambient temperature rises, the RR lens 1078 which is a driven object is moved to a great extent in spite of the same instruction signal.

The thermally sensitive resistor 1080 determines the offset voltage of a differential amplifier which includes the four resistors 1022 to 1024 and 1027 and the operational amplifier 1049 and is arranged to amplify the output voltage of the Hall element 1012. If the ambient temperature rises and the resistance value of the thermally sensitive resistor 1080 increases, the offset component of the output voltage of the differential amplifier decreases. In other words, for example, if the ambient temperature rises and the resistance value of the thermally sensitive resistor 1080 increases, it follows that the output signal of the Hall element 1012 is shifted to a lower value, so that the RR lens 1078 which is a driven object is shifted toward a subject side or a focus side in spite of the same instruction signal.

Figure 21C:
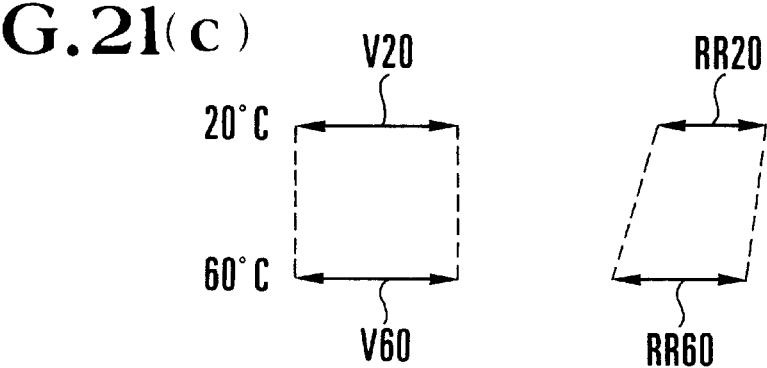
Figure 22:
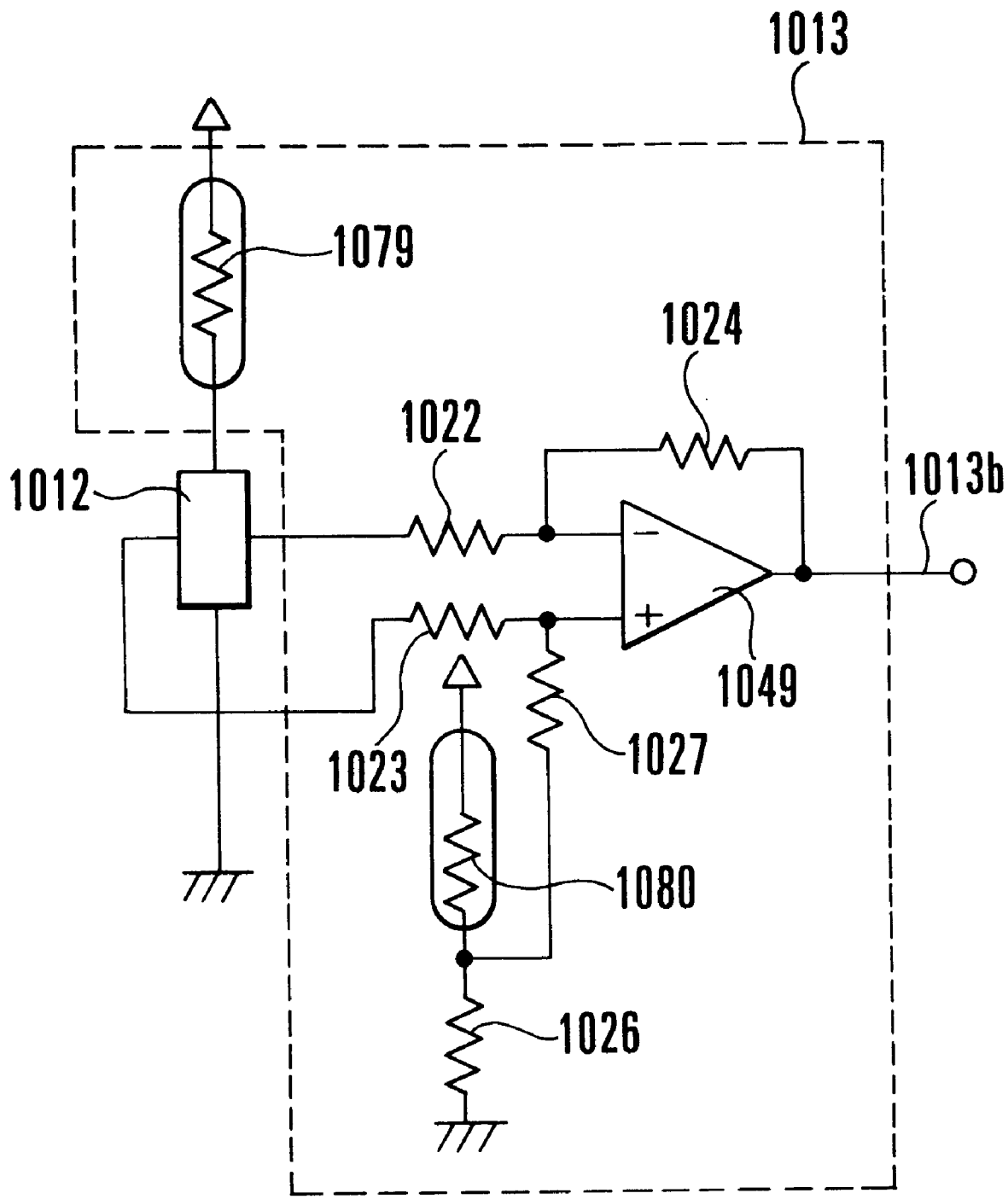
FIG. 22 is a circuit diagram of the amplification circuit used in the embodiment shown in FIGS. 21(a) to 21(c)

Accordingly, by optimizing the temperature characteristics of the thermally sensitive resistors 1079 and 1080, it is possible to vary the position and amount of movement of the RR lens 1078 at a temperature of, for example, 60° C. with respect to the position and amount of movement of the RR lens 1078 at a temperature of 20° C., as shown in FIG. 21(c), whereby it is possible to correct the variations of the electronic cam loci due to a temperature variation which occurs if the second fixed lens 1077 or the RR lens 1078 is formed of a plastic material. Although in this embodiment a thermally sensitive resistor is used as a temperature-sensitive element, another temperature-sensitive element, such as a thermistor, may also be used.

Another embodiment will be described below with reference to FIG. 23. Although the aforesaid embodiment is arranged to drive only the RR lens 1078 by using the driving device according to the present invention, the following embodiment is arranged to drive both the zooming lens 1076 and the RR lens 1078 by using the driving device according to the present invention.

Figure 23:
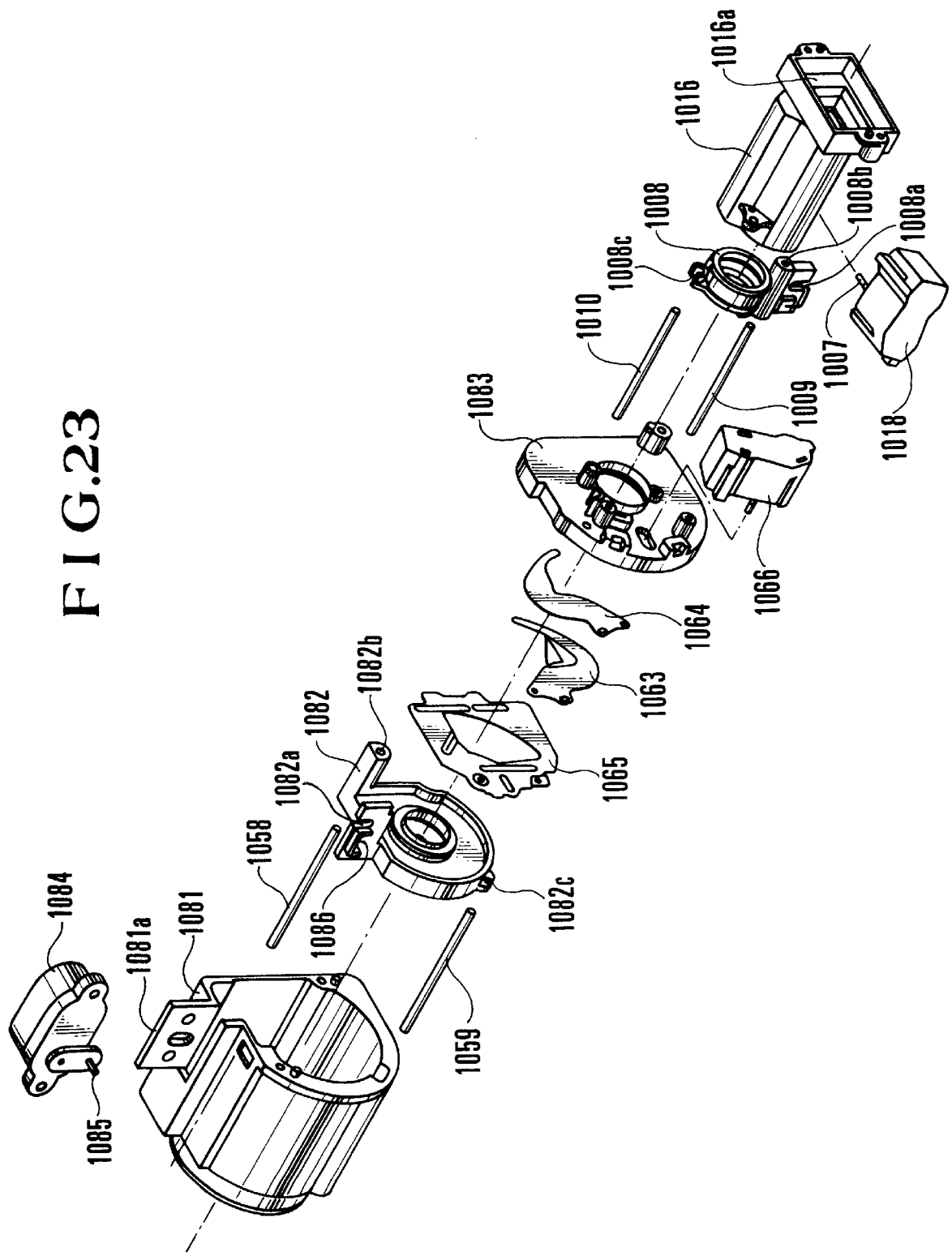
FIG. 23 is an exploded perspective view of a lens barrel according to another embodiment of the present invention.

FIG. 23 is an exploded perspective view showing the lens barrel assembly of a zoom lens for use in a video camera to which the present invention is applied. In FIG. 23, identical reference numerals are used to denote constituent elements substantially identical to those used in the embodiment shown in FIG. 17, and the description thereof is omitted for the sake of simplicity.

The lens barrel assembly shown in FIG. 23 includes a first fixed lens barrel 1081, a first movable lens barrel 1082 and a second fixed lens barrel 1083. The first fixed lens barrel 1081 has a motor mounting portion 1081a, and a first fixed lens group which contains a lens made of plastic is fixed to the first fixed lens barrel 1081. The first movable lens barrel 1082 has a first slide groove 1082a through which a fitting shaft 1085 of a motor 1084 is inserted, a slide hole 1082b and a slide groove 1082c, and a pressure spring 1086 and a zooming lens are fixed to the first movable lens barrel 1082. A second fixed lens group which contains a lens made of plastic is fixed to the second fixed lens barrel 1083.

The first and second guide bars 1058 and 1059 for the zooming lens are fixed to the first and second fixed lens barrels 1081 and 1083, and are respectively inserted through the slide hole 1082b and the slide groove 1082c which are formed in the first movable lens barrel 1082, thereby supporting the first movable lens barrel 1082 for movement back and forth along the optical axis.

The motor 1084 for driving the zooming lens is fixed to the motor mounting portion 1081a of the first fixed lens barrel 1081 by known means such as screw-mounting. The fitting shaft 1085 of the motor 1084 is engaged with the first slide groove 1082a of the first movable lens barrel 1082, and the first movable lens barrel 1082 is moved along the optical axis by the rotation of the motor 1084. In the above-described arrangement and construction, the first movable lens barrel 1082 to which the zooming lens 1076 is fixed is moved back and forth along the optical axis by the rotation of the motor 1084.

The shown lens barrel assembly also includes the iris blades 1063 and 1064, the pressure plate 1065 for restricting the positions of the iris blades 1063 and 1064, the iris driving motor 1066 which rotationally drives the iris blades 1063 and 1064 to cause them to open and close, the second movable lens barrel 1008 to which the RR lens 1078 is fixed, and the first and second guide bars 1009 and 1010 for the focusing and compensation lens. The first and second guide bars 1009 and 1010 are fixed to the second fixed lens barrel 1083 and the third fixed lens barrel 1016, and are respectively inserted through the slide hole 1008b and the second slide groove 1008c of the second movable lens barrel 1008, thereby supporting the second movable lens barrel 1008 for movement back and forth along the optical axis. The motor 1018 is fixed to the third fixed lens barrel 1016, and the output shaft 1007 is fitted into the first slide groove 1008a of the second movable lens barrel 1008, so that the second movable lens barrel 1008 is moved back and forth along the optical axis by the rotation of the motor 1018.

This embodiment having the above-described arrangement and construction can achieve more rapid, more silent and more accurate lens driving than the zoom lens according to the embodiment shown in FIG. 17. In addition, if the embodiment shown in FIG. 22 is applied, it is possible to readily prevent a variation in the focus position of the entire zoom lens due to a variation due to the surrounding temperature in the focal length of the first lens group which contains the plastic lens fixed to the first fixed lens barrel 1081.

Although in each of the above-described embodiments the position of the driven object is detected by means of the Hall element 1012, a magneto-resistance element may also be employed. In addition, a PSD sensor or a potentiometer using a variable resistor may be employed to impart the temperature characteristics to the driving characteristics of the driven object, as described in connection with each of the embodiments shown in FIGS. 17 to 23. An actuator which is not of a rotary type may also be employed as a power source.

An embodiment in which a potentiometer using a variable resistor is employed as a position detecting sensor and a voice coil motor is employed as a driving power source will be described below with reference to FIGS. 24 and 25.

Figure 24:
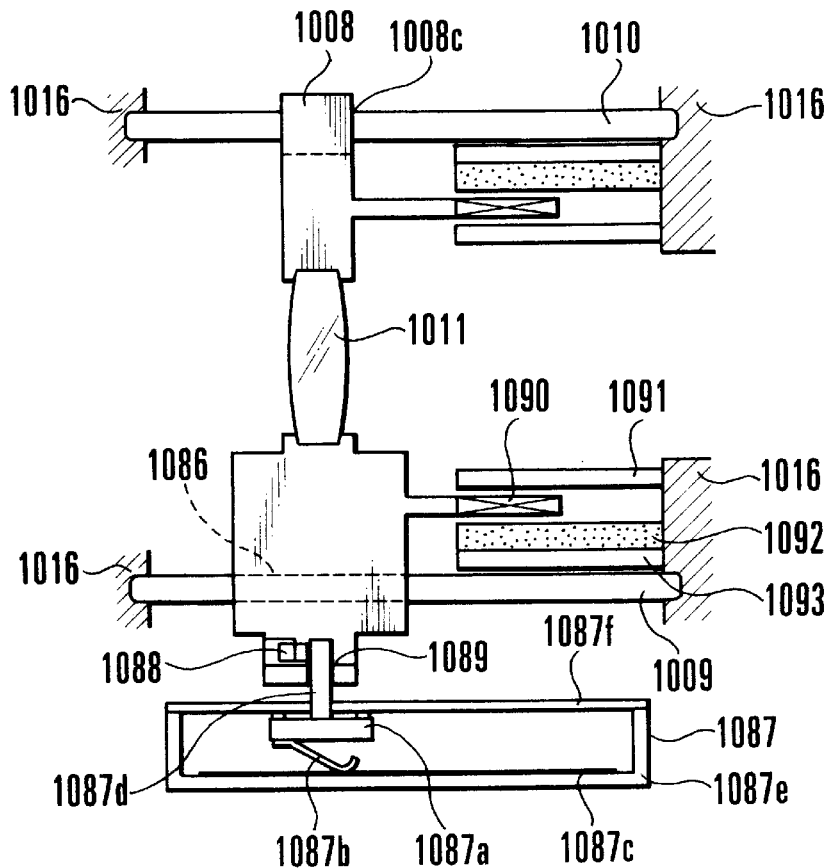
FIG. 24 is a cross-sectional view of an essential portion of another embodiment of the present invention.
Figure 25:
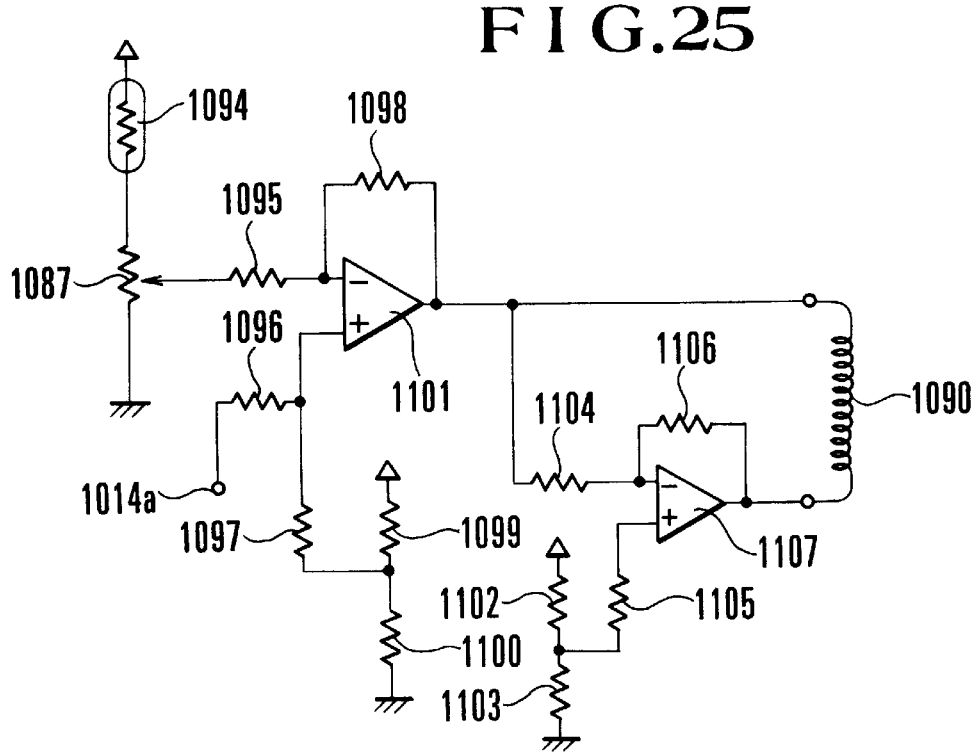
FIG. 25 is a circuit diagram of the amplification circuit used in the embodiment shown in FIG. 24.

In FIG. 24, identical reference numerals are used to denote constituent elements substantially identical to those used in the embodiment shown in FIG. 14. As shown in FIG. 24, the movable lens 1011 is fixed to the lens barrel 1008. The lens barrel 1008 has the first slide hole 1008*b*, the second slide groove 1008*c* and an engagement hole 1089, and a movable coil 1090 of the voice coil motor and a pressure spring 1088 are fixed to the lens barrel 1008.

The first and second guide bars 1009 and 1010 are fixed to the third fixed lens barrel 1016, and are respectively inserted through the first slide hole 1008*b* and the second slide groove 1008*c* of the lens barrel 1008 and guide the lens barrel 1008 for movement back and forth along the optical axis. A known potentiometer 1087 uses a variable resistor and includes a moving element 1087*a* having a power transmission pin 1087*d* to which a brush 1087*b* is fixed, a resistive element 1087*c* provided on an inner surface of a case 1087*e*, and a cover 1087*f* which covers the open side of the case 1087*e*. The potentiometer 1087 has first and second power source terminals and an output terminal (none of which is-shown). The first power source terminal is connected to the power source +V via the thermally sensitive resistor 1079 (refer to FIG. 22), the second power source terminal is grounded, and the output terminal is connected to the amplifying circuit 1013 of the driving circuit.

The power transmission pin 1087*d* of the potentiometer 1087 is engaged with the engagement hole 1089 of the lens barrel 1008 and is urged against one side face of the engagement hole 1089 by the pressure spring 1088. In the above-described arrangement and construction, the potentiometer 1087 outputs a voltage corresponding to the position of the lens barrel 1008 from the output terminal.

The voice coil motor includes yokes 1091 and 1093 and a field magnet 1092. The yokes 1091 and 1093 and the field magnet 1092 are fixed to the third fixed lens barrel 1016.

In the above-described arrangement and construction, by energizing the movable coil 1090 of the voice coil motor, the lens barrel 1008 is moved back and forth along the optical axis and an output voltage corresponding to the position of the lens barrel 1008 is provided at the output terminal of the potentiometer 1087.

The circuit construction of this embodiment will be described below with reference to FIG. 25. The circuit shown in FIG. 25 includes the potentiometer 1087, the movable coil 1090 of the voice coil motor, a thermally sensitive resistor 1094, resistors 1095 to 1106, an operational amplifier 1101 having two inputs, one of which is connected to the output of the potentiometer 1087, and an operational amplifier 1107 having two inputs, one of which is connected to the output of the operational amplifier 1101.

In the above-described arrangement and construction, when the resistance value of the thermally sensitive resistor 1094 varies with the ambient temperature, the output voltage of the potentiometer 1087 is shifted and the manner of variation of the output voltage with respect to the amount of movement of the lens barrel 1008 also changes. Accordingly, the position control characteristics of the lens barrel 1008 can be imparted a temperature characteristic such that the lens barrel 1008 is shifted closer to the subject side under high-temperature conditions than under normal-temperature conditions so that the lens barrel 1008 can be moved to a greater extent with respect to a predetermined variation in an input signal under the high-temperature conditions.

In this embodiment, the lens barrel 1008 is supported by the second guide bar 1010 and is driven by the voice coil motor. However, it is also possible to achieve similar effects by adopting an arrangement in which the lens barrel 1008 is rotationally moved forward by means of a known helicoid screw and a potentiometer is provided in the direction in which the lens barrel 1008 is rotationally moved forward.

Although in the above-described embodiment the temperature characteristics are imparted to the position control of a driven object by using a thermally sensitive element, such as a thermally sensitive resistor, in a driving circuit, it is also possible to detect the ambient temperature by using a thermometer and to cause a control instruction signal to reflect the result of the detection.

Figure 26:
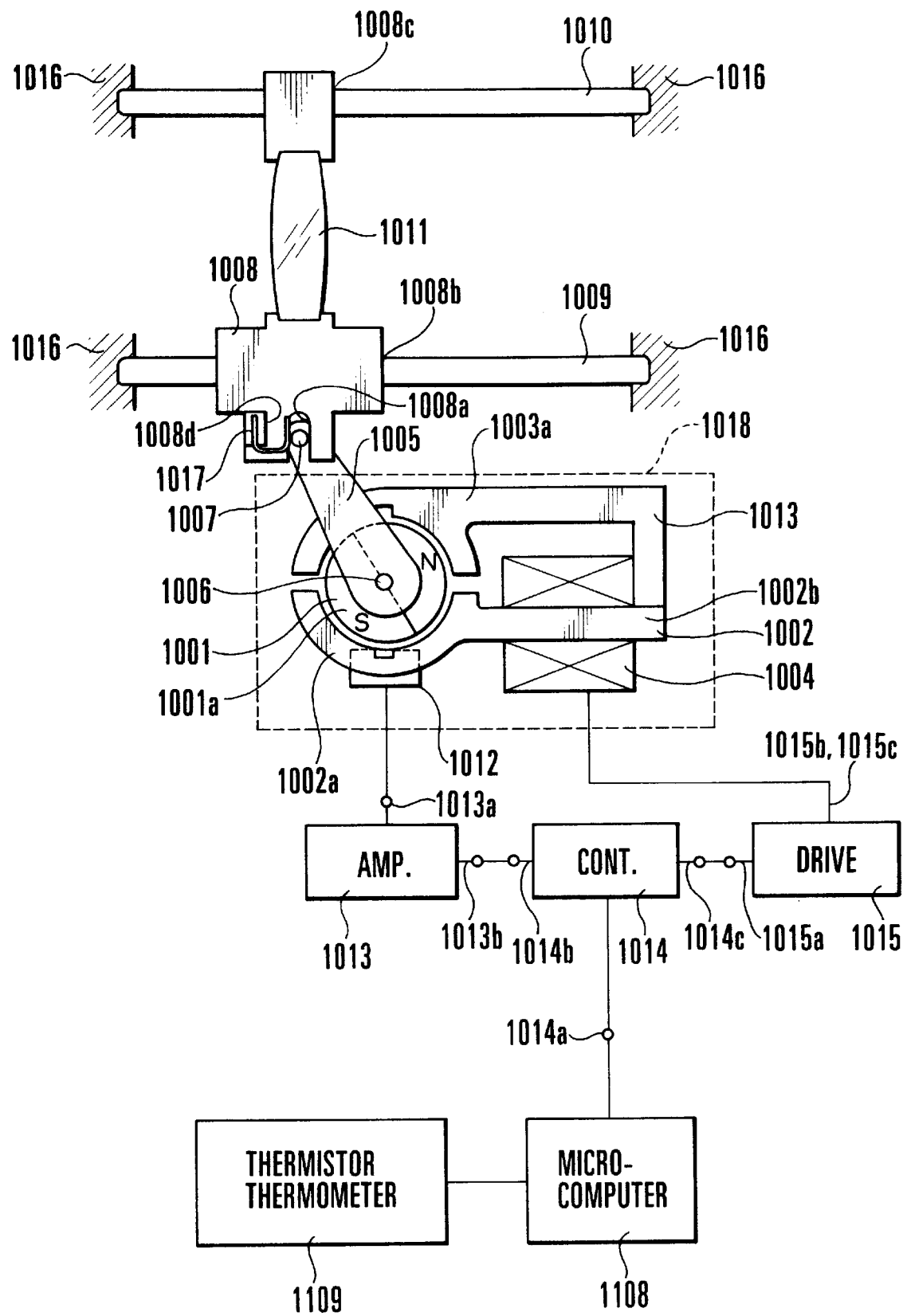
FIG. 26 is a diagrammatic view showing an essential portion of another embodiment of the present invention.

FIG. 26 shows another embodiment. In this embodiment, a PSD sensor is used as a position detector in place of the Hall element 1012 used in the above-described embodiment and a thermally sensitive resistor is provided as a sensor, and a microcomputer performs signal processing on the sensor output and outputs a control instruction signal which reflects the result of the signal processing. In FIG. 26, identical reference numerals are used to denote constituent elements substantially identical to those used in the embodiment described above with reference to FIGS. 14 to 16.

Referring to FIG. 26, the input terminal of a microcomputer 1108 is connected to a thermistor thermometer 1109, and the output terminal of the microcomputer 1108 is connected to the input terminal 1014*a* of the control circuit 1014. The microcomputer 1108 stores temperature coefficients in its inside, and varies a signal to be transmitted from the output terminal to the control circuit 1014, according to the output signal of the thermistor thermometer 1109. In this arrangement and construction, it is possible to easily obtain complicated characteristics relative to temperature variations.

Figure 27:
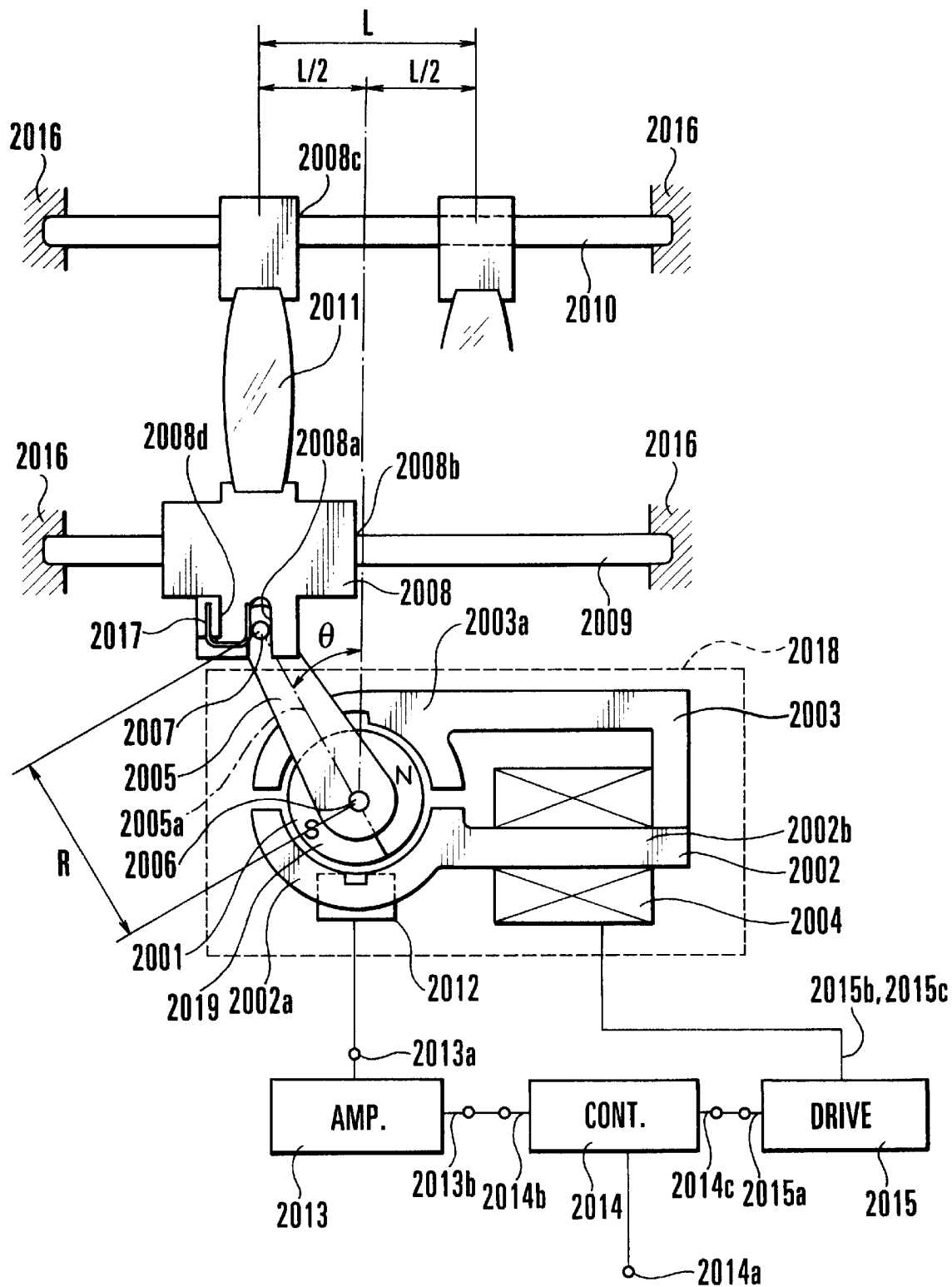
FIG. 27 is a diagrammatic view showing an essential portion of another embodiment of the present invention.

FIG. 27 is a diagrammatic view showing the essential portion of an embodiment in which the driving device according to the present invention is applied to an optical apparatus. FIGS. 28(*a*) to 28(*c*) are explanatory views showing the relationship between each position of a rotor and the output signal of a Hall element in the embodiment shown in FIG. 27.

Referring to FIG. 27, a permanent magnet 2001 is, for example, a neodymium-base plastic permanent magnet formed in a cylindrical shape and has an outer-diameter portion magnetized to have two poles, and the magnetization waveform is sinusoidal. This sinusoidal two-pole magnetization waveform is obtained by preparing the permanent magnet 2001 having an inner diameter smaller than an outer diameter and magnetizing the permanent magnet 2001 in a parallel magnetic field. A first stator 2002 is made from, for example, laminated silicon steel sheets blanked by press working, and has a magnetic-pole portion 2002*a*, which is opposed to the permanent magnet 2001, and an extending portion 2002b. A second stator 2003 is also made from, for example, laminated silicon steel sheets blanked by press working, and has a magnetic-pole portion 2003a opposed to the permanent magnet 2001.

A coil (field coil) 2004 is formed by winding a copper wire around a hollow bobbin (not show), and is fitted onto the extending portion 2002b of the first stator 2002. An arm 2005 is molded in, for example, polycarbonate resin, and is integrally provided with a rotating shaft 2006 and a slide shaft 2007. The permanent magnet 2001 is fixed to the rotating shaft 2006, thereby constituting a rotor 2019. Reference numeral 2005a denotes the central axis of the arm 2005.

The rotating shaft 2006 formed integrally with the arm 2005 is turnably supported by a bearing of a case (not shown). A motor 2018 includes the rotor 2019, the first stator 2002, the second stator 2003, the coil 2004 and the arm 2005.

A lens barrel 2008 which is a driven object is molded in, for example, polycarbonate resin, and is provided with a first slide groove 2008a, a slide hole 2008b, a second slide groove 2008c and a spring engagement portion 2008d. A lens 2011 (also called the photographing lens 2011), which constitutes part of a photographing lens group which is a movable object, is held by the inner circumferential portion of the lens barrel 2008.

The slide shaft 2007 formed integrally with the arm 2005 is fitted into the first slide groove 2008a of the lens barrel 2008, and the pressure spring 2017 formed by pressing, for example, phosphor bronze is fixed to the spring engagement portion 2008d of the lens barrel 2008. The pressure spring 2017 urges the slide shaft 2007 against one side face of the first slide groove 2008a of the lens barrel 2008. The slide shaft 2007 and the first slide groove 2008a constitutes converting means for converting the rotary motion of the arm 2005 into a rectilinear motion and transmitting the rectilinear motion to the lens barrel 2008.

First and second guide bars 2009 and 2010, which serve as guide means, are disposed parallel to the optical axis of the photographing lens 2011. The first guide bar 2009 is made of, for example, stainless steel, and is fixed at its opposite ends to a lens barrel 2016 by press-fitting or other known means. The first guide bar 2009 is inserted through the slide hole 2008b of the lens barrel 2008 to support the lens barrel 2008 for movement back and forth in the longitudinal direction of the first guide bar 2009.

The second guide bar 2010 is made of, for example, stainless steel and is fixed at its opposite ends to the lens barrel 2016 by press-fitting or other known means. The second guide bar 2010 is inserted through the second slide groove 2008c of the lens barrel 2008 to support the lens barrel 2008 for movement back and forth in the longitudinal direction of the second guide bar 2010.

A Hall element 2012 serves as rotational position detecting means for detecting the rotational position of the arm 2005. The Hall element 2012 is a known Hall element, and is fixed to the case (not shown) in such a manner as to be opposed to the outer circumference of the permanent magnet 2001 with a slight clearance. The Hall element 2012 provides an output signal proportional to the magnetic flux density on the surface of the permanent magnet 1001 during the rotation of the permanent magnet 2001.

An amplification circuit 2013 has an input terminal 2013a electrically connected to an output terminal of the Hall element 2012, and amplifies the output signal of the Hall element 2012. The amplification circuit 2013 includes a circuit for supplying a bias voltage to the Hall element 2012.

A control circuit 2014 has a first input terminal 2014a, a second input terminal 2014b and an output terminal 2014c. The first input terminal 2014a of the control circuit 2014 is electrically connected to, for example, a focus control circuit of a video camera.

A voltage value corresponding to a target position of the photographing lens 2011 which is a movable object is supplied to the first input terminal 2014a of the control circuit 2014 as a control instruction signal. The second input terminal 2014b of the control circuit 2014 is electrically connected to an output terminal 2013b of the amplification circuit 2013. A voltage value corresponding to the current position of the photographing lens 2011 which is a movable object is supplied to the second input terminal 2014b of the control circuit 2014. The control circuit 2014 amplifies the difference between the voltage value corresponding to the target position of the photographing lens 2011 which is supplied to the first input terminal 2014a and the voltage value corresponding to the current position of the photographing lens 2011 which is supplied to the second input terminal 2014b, and provides a voltage corresponding to the difference between the target position and the current position to the output terminal 2014c.

A driving circuit 2015 has an input terminal 2015a and first and second output terminals 2015b and 2015c. The input terminal 2015a is electrically connected to the output terminal 2014c of the control circuit 2014, and the first and second output terminals 2015b and 2015c are electrically connected to the coil 2004.

If a voltage value applied to the input terminal 2015a of the driving circuit 2015 is higher than a predetermined voltage, the driving circuit 2015 sets the voltage difference between the first output terminal 2015b and the second output terminal 2015c so that a voltage to be outputted from the first output terminal 2015b can be made higher than a voltage to be outputted from the second output terminal 2015c, and applies voltages proportional to the absolute value of the difference between the predetermined voltage and the voltage inputted to the input terminal 2015a to the coil 2004 via the respective first and second output terminals 2015b and 2015c.

If a voltage value applied to the input terminal 2015a is lower than the predetermined value, the driving circuit 2015 sets the voltage difference between the first output terminal 2015b and the second output terminal 2015c so that a voltage to be outputted from the first output terminal 2015b can be made lower than a voltage to be outputted from the second output terminal 2015c, and applies voltages proportional to the absolute value of the difference between the predetermined voltage and the voltage inputted to the input terminal 2015a to the coil 2004 via the respective first and second output terminals 2015b and 2015c.

In FIG. 27, symbol R represents the length of the arm 2005, i.e., the distance from the rotational center of the rotor 2019 to the center of the slide shaft 2007, symbol L represents the stroke, taken along the optical axis, of the photographing lens 2011 which is a driven object, and symbol θ represents the angle of rotation of the arm 2005 about the rotating shaft 2006.

The operation of this embodiment will be described below. When an instruction signal corresponding to the target position of the lens barrel 2008 which is a driven object is supplied to the first input terminal 2014a of the control circuit 2014 as a voltage, the control circuit 2014 amplifies the difference between the instruction signal and the output signal of the Hall element 2012, and inputs a sufficient voltage to clear the difference to "0" to the driving circuit 2015. The driving circuit 2015 applies this voltage to the coil 2004 of the motor 2018. According to such a voltage, the rotor 2019 of the motor 2018 rotates up to a position at which the Hall element 2012 outputs a voltage value corresponding to the instruction signal.

At this time, the rotation of the rotor 2019 is transmitted to the lens barrel 2008 via the arm 2005, and the lens barrel 2008 moves to a position corresponding to the instruction signal. As is apparent from the above description, in this embodiment, the arm 2005 is directly fixed to the rotor 2019 which is a driving power source, so that the lens barrel 2008 can be driven.

The relationship between the torque generated by the motor 2018 to drive the lens barrel 2008 and a thrust acting on the lens barrel 2008 is expressed as:

$$F = (T/R) \times \cos\theta \tag{1}$$

where F represents the thrust required to drive the lens barrel 2008 and T represents the torque generated by the motor 2018. As is apparent from Equation (1), as the rotational angle θ of the arm 2005 becomes larger, the required torque to be generated by the motor 2018 to drive the lens barrel 2008 becomes larger. In the embodiment shown in FIG. 27, in order to minimize the required torque to be generated by the motor 2018 to drive the lens barrel 2008, the boundary between the poles of the permanent magnet 2001 of the rotor 2019 which constitutes the motor 2018 is opposed to the center of the magnetic-pole portions 2002a and 2003a of the first and second stators 2002 and 2003 at a position corresponding to ½ of the total stroke L of the lens barrel 2008. At that position, the arm 2005 is perpendicular to the guide bars 2009 and 2010.

Further, in this embodiment, the torque T generated by the motor 2018 with respect to the rotational angle θ shown in FIG. 27 is expressed as:

$$T = T_0 \cos\theta \tag{2}$$

where $T_0$ represents the peak value of the torque generated by the motor 2018. The relationship between the stroke L of the lens barrel 2008 and the length R of the arm 2005 is expressed as:

$$L/2 = R \sin\theta_1 \tag{3}$$

where $\theta_1$ represents the rotational angle of the arm 2005 at either end of the stroke of the lens barrel 2008. From Equations (1), (2) and (3), the relationship among the peak value $T_0$ of the torque to be generated by the motor 2018, the stroke L of the lens barrel 2008 and the length R of the arm 2005 is expressed as:

$$T_0 = F_0 \times R^3 / (R^2 - (L/2)^2) \tag{4}$$

where $F_0$ represents the thrust required to drive the lens barrel 2008. According to this embodiment, in order that the output torque of the motor 2018 can be minimized to reduce the size of the motor 2018 and hence the size of the driving device, the relationship between the stroke L and the length R which makes it possible to obtain an infinitesimal value from Equation (4) is expressed as:

$$R = L \times \sqrt{3}/2$$

where the rotational angle of the arm 2005 is 70.6° with respect to the total stroke of the lens barrel 2008.

If this embodiment is to be applied to various driving devices, some driving devices will have to be designed in consideration of space rather than power consumption. In this case, although it may be necessary to reduce the length of the arm 2005, it is preferable that the rotational angle of the arm 2005 be selected to be not more than an electrical angle of 120° so that the lens barrel 2008 can be efficiently driven. Contrarily, if it is necessary to use a control circuit having a simple construction, it becomes necessary to decrease the rotational angle of the rotor 2019 by increasing the length of the arm 2005 so as to decrease, over the entire stroke of the lens barrel 2008, the amount of variation of the torque generated by the motor 2018 when a predetermined current is made to flow through the motor 2018.

In the above-described case, it is desirable that the rotational angle of the arm 2005 be selected to be 24° to 60°. In this case, the required torque to be generated by the motor 2018 can be reduced to a maximum of twice the value of the required minimum torque.

In consequence, in this embodiment, the rotational angle of the rotor 2019 is set to 24° to 120° in terms of an electrical angle.

Position control of the driving device according to this embodiment will be described below. In this kind of driving device, if the movement of the lens barrel 2008 which is a driven object does not have linearity with respect to an instruction signal, the position of the lens barrel 2008 is difficult to control with high precision.

In this embodiment, since the permanent magnet 2001 is sinusoidally magnetized and the mounting angle between the arm 2005 and the Hall element 2012 is appropriately selected, the position of the lens barrel 1008 and the output voltage of the Hall element 1012 are imparted linearity, whereby the position of the lens barrel 1008 can be easily controlled.

The mounting angles of the permanent magnet 2001, the arm 2005 and the Hall element 2012 which suffice to impart linearity to the position of the lens barrel 2008 and the output voltage of the Hall element 2012 will be described below with reference to FIGS. 27 and 28(a) to 28(c).

In the embodiment of the driving device shown in FIG. 27, the mounting direction (the central axis 2005a) of the arm 2005 coincides with the direction of the boundary between the poles of the permanent magnet 2001. The Hall element 2012 is positioned so that it can oppose the boundary between the poles of the permanent magnet 2001 when the arm 2005 is positioned at right angles to the longitudinal direction of the first and second guide bars 2009 and 2010.

Figure 28A:
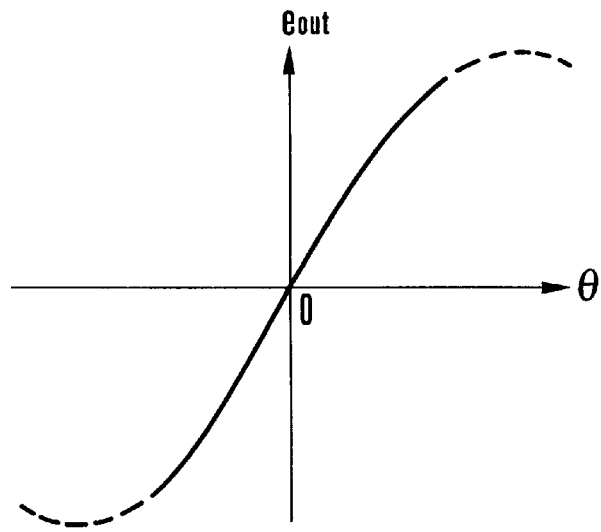
FIGS. 28(a), 28(b) and 28(c) are explanatory views showing the output signals from a Hall element with respect to individual rotational positions of the rotor shown in FIG. 27.
Figure 28B:
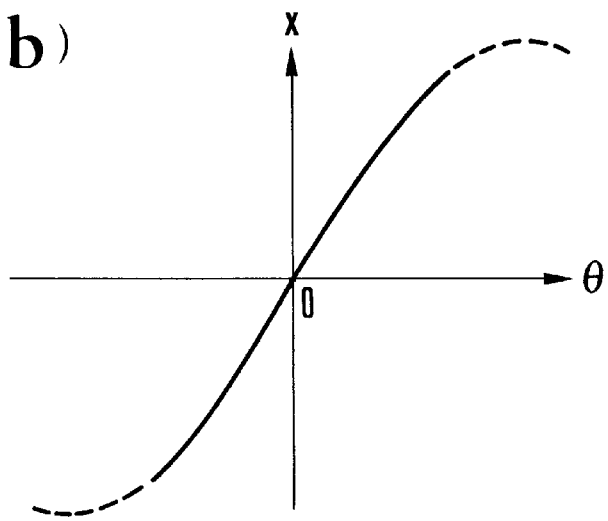
Figure 28C:
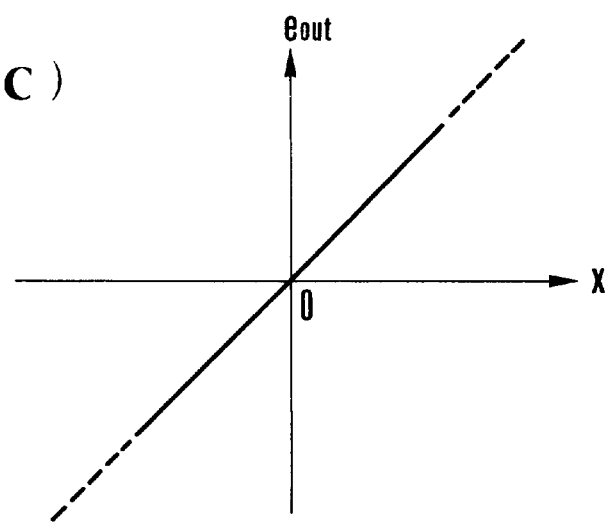

The relationship among the output signal of the Hall element 2012, the rotational angle of the rotor 2019 and the position of the lens barrel 2008 will be described below with reference to FIGS. 28(a) to 28(c). In FIGS. 28(a) to 28(c), the horizontal axis H represents the rotational angle of the rotor 2019, and "0" represents the position at which the arm 2005 is positioned at right angles to the longitudinal direction of the first and second guide bars 2009 and 2010. The vertical axis $e_{out}$ represents the output signal of the Hall element 2012, and "x" represents the position of the lens barrel 2008.

Since the permanent magnet 2001 is sinusoidally magnetized, the output voltage $e_{out}$ of the Hall element 2012 becomes sinusoidal with respect to the rotational angle θ of the rotor 2019, as shown in FIG. 28(a). In addition, since the rotation of the slide shaft 2007 of the arm 2005 becomes equal to the longitudinal components of the first and second guide bars 2009 and 2010 owing to the arrangement and construction described above with reference to FIG. 27, the position x of the lens barrel 2008 becomes sinusoidal with respect to the rotational angle θ of the rotor 2019, as shown in FIG. 28(b).

Since both the output voltage $e_{out}$ of the Hall element 2012 and the position x of the lens barrel 2008 become sinusoidal with respect to the rotational angle θ of the rotor 2019, the output voltage $e_{out}$ of the Hall element 2012 becomes linear with respect to the position x of the lens barrel 2008, as shown in FIG. 28(c). Accordingly, the position of the lens barrel 2008 can be easily controlled on the basis of the output voltage $e_{out}$ of the Hall element 2012.

Figure 29:
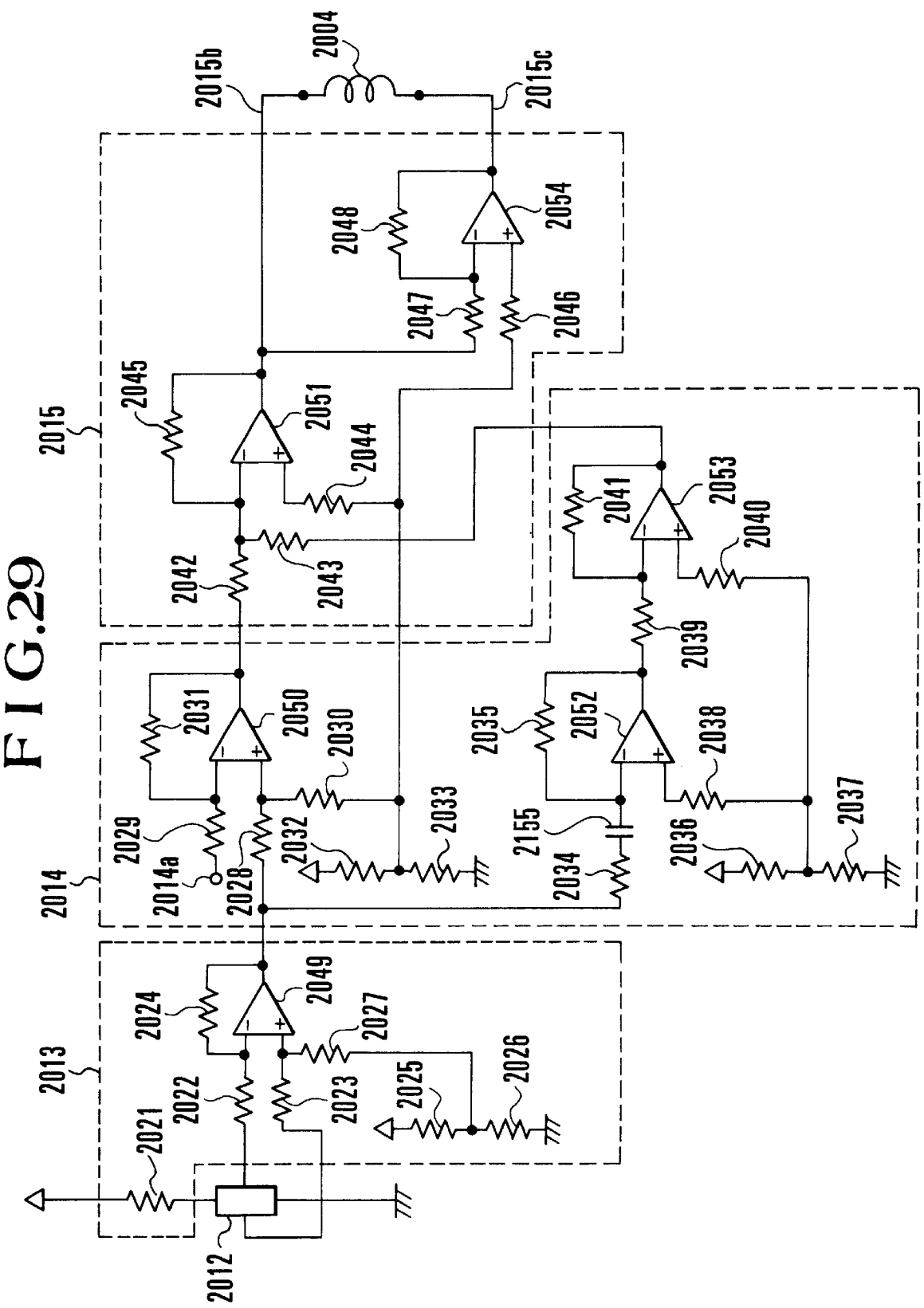
FIG. 29 is a circuit diagram showing individual constituent elements of the embodiment shown in FIG. 27.

The driving circuit according to this embodiment will be described below with reference to FIG. 29. In FIG. 29, identical reference numerals are used to denote constituent elements substantially identical to those described above with reference to FIG. 27. The circuit shown in FIG. 29 includes the Hall element 2012 described above with reference to FIG. 27, the amplification circuit 2013, the control circuit 2014, the driving circuit 2015 and the coil 2004. Reference numerals 2021 to 2048 denote resistors, reference numerals 2049 to 2054 denote operational amplifiers, and reference numeral 2155 denotes a capacitor.

The resistor 2021 is connected to a first input terminal of the Hall element 2012 and to a power source, and determines a bias current to flow through the Hall element 2012. Since the bias current to flow through the Hall element 2012 is a factor which determines the gain of the Hall element 2012, this gain is determined by the resistor 2021. The six resistors 2022 to 2027 and the operational amplifier 2049 constitute a known differential amplifier, and first and second output terminals of the Hall element 2012 are respectively connected to first and second input terminals of the differential amplifier.

The resistors 2032 and 2033 are provided for producing a reference voltage. The resistors 2032 and 2033, the four resistors 2028 to 2031 and the operational amplifier 2050 constitute a known differential amplifier. The first input terminal 2014a of the differential amplifier which includes the operational amplifier 2050 is an input terminal of the lens driving device according to this embodiment, and is connected to an instruction signal generating device, such as an automatic focus detecting device used in a video camera.

The second input terminal 2014b of the differential amplifier which includes the operational amplifier 2050 is connected to the output terminal of a differential amplifier which includes the operational amplifier 2049. The differential amplifier which includes the operational amplifier 2050 amplifies the difference between an instruction signal given from the outside and the signal obtained by amplifying the output signal of the Hall element 2012 which corresponds to the rotational position of the rotor 2019. The eight resistors 2034 to 2041, the capacitor 2155 and the operational amplifiers 2052 and 2053 constitute a speed signal amplifying circuit. The input terminal of the speed signal amplifying circuit is connected to the output terminal of the differential amplifier which includes the operational amplifier 2049 for amplifying the output signal of the Hall element 2012. The speed signal amplifying circuit amplifies the variation of the output signal of the Hall element 2012 which represents the rotational speed of the rotor 2019.

The four resistors 2042 to 2045 and the operational amplifier 2051 constitute a known amplifier. The input terminal 2015a of the known amplifier is connected to the output terminal of the differential amplifier which includes the operational amplifier 1050, i.e., a first output terminal 2014e of the control circuit 2014, and to the output terminal of the speed signal amplifying circuit, i.e., a second output terminal of the control circuit 2014.

The amplifier which includes the operational amplifier 2051 outputs a voltage relative to a reference voltage which corresponds to an instruction signal and a deviation of the position of the lens barrel 2008 as well as the rotational speed of the rotor 2019. The three resistors 2046 to 2048 and the operational amplifier 2054 constitute a known inverting amplifier. A first input terminal of the inverting amplifier is connected to the output terminal of the amplifier which includes the operational amplifier 2051, and the inverting amplifier inverts the output voltage of the amplifier, which includes the operational amplifier 2051, with respect to the reference voltage and outputs the resultant inverted voltage.

The output terminal of the amplifier which includes the operational amplifier 2051 is the first output terminal 2015b of a driving circuit which is connected to a first end of the coil 2004, and the output terminal of the inverting amplifier which includes the operational amplifier 2054 is the second output terminal 2015c of the driving circuit which is connected to a second end of the coil 2004.

The lens driving device according to this embodiment having the above-described arrangement and construction is capable of accurately driving the lens barrel 2008, which is a driven object, in accordance with an instruction signal. In the case of the above-described embodiment, when the photographing lens 2011 is to be driven by the driving device, it is desirable to set the gain of the driving circuit so that a sufficient electric current to drive a load, such as the weight of the lens barrel 2008, can flow through the coil 2004 of the motor 2018 when the photographing lens 2011 is moved along the optical axis by only a value which allows the amount of focus deviation to become not more than half of the diameter of an allowable circle of confusion. With this setting, it is possible to provide a sharply focused image.

Figure 30:
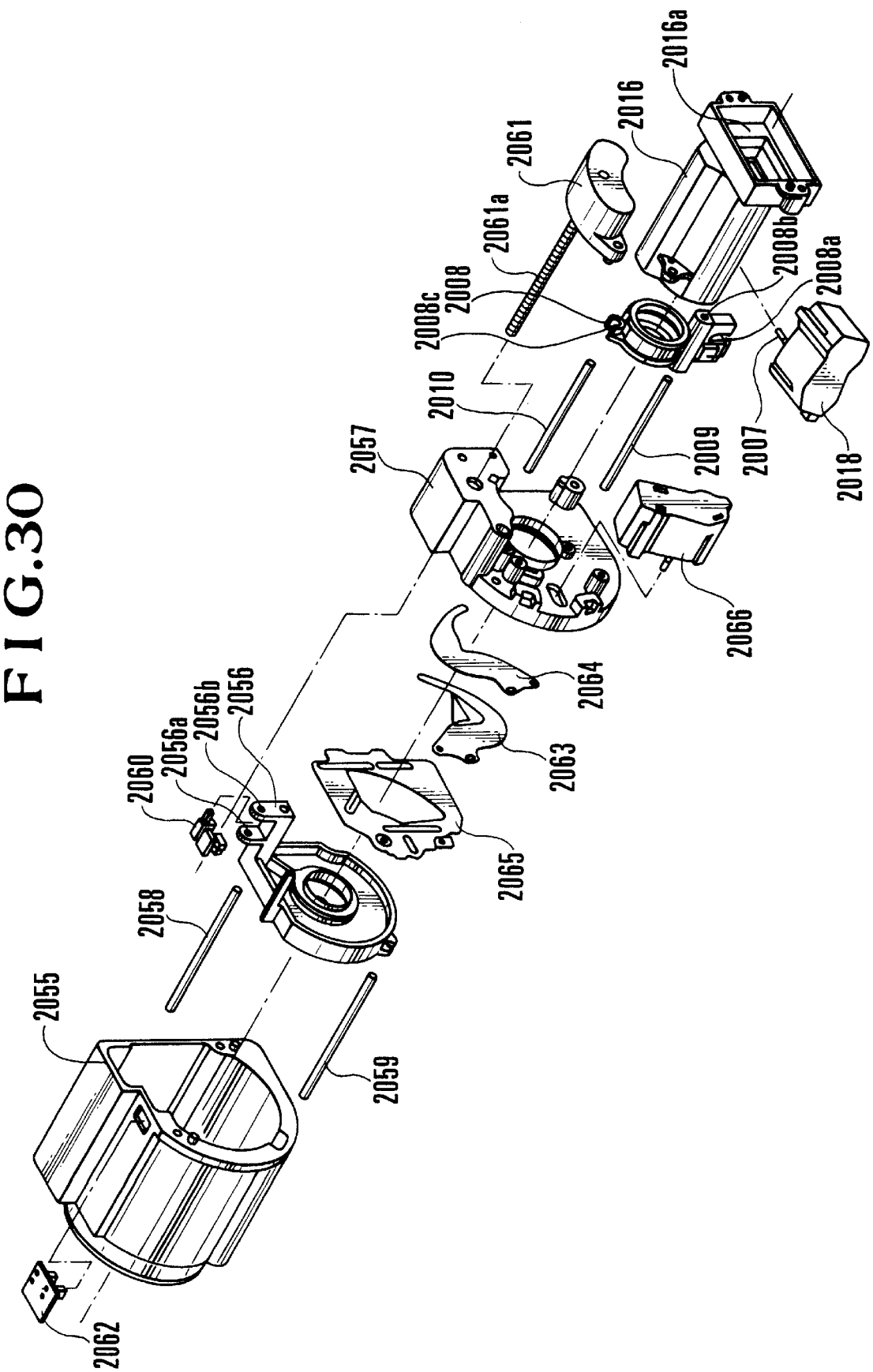
FIG. 30 is an exploded perspective view showing an essential portion of one example to which the embodiment shown in FIG. 27 is applied.

FIG. 30 is an exploded perspective view showing a portion in which the embodiment shown in FIGS. 27 to 29 is applied to an optical apparatus. In FIG. 30, identical reference numerals are used to denote constituent elements substantially identical to those shown in FIG. 27, and the description thereof is omitted for the sake of simplicity.

The arrangement shown in FIG. 30 includes a first fixed lens barrel 2055 to which a first fixed lens group is fixed, a first movable lens barrel 2056 to which a zooming lens is fixed, a second fixed lens barrel 2057 to which a second fixed lens group is fixed, and first and second guide bars 2058 and 2059 for the zooming lens. The first and second guide bars 2058 and 2059 are fixed to the first and second fixed lens barrels 2055 and 2057, and are respectively inserted through a slide hole and a slide groove which are formed in the first movable lens barrel 2056, thereby supporting the first movable lens barrel 2056 for movement back A first stepping optical axis.

A first stepping motor 2061 has an output shaft formed as a screw shaft 2061a. A rack member 2060 is fitted into mounting holes 2056a and 2056b formed in the first movable lens barrel 2056, and the rack portion of the rack member 2060 is meshed with the screw shaft 2061a of the stepping motor 2061. A reset sensor 2062 is provided for resetting the position of the first movable lens barrel 2056. In the above-described arrangement and construction, the zooming lens is moved back and forth along the optical axis by the rotation of the stepping motor 2061. A pressure plate 2065 is provided for restricting the positions of iris blades 2063 and 2064.

The arrangement shown in FIG. 30 also includes an iris driving motor 2066 which rotationally drives the iris blades 2063 and 2064 to cause them to open and close, the third fixed lens barrel 2016, and the second movable lens barrel 2008 to which a focusing and compensation lens is fixed.

The first and second guide bars 2009 and 2010 for the focusing and compensation lens are fixed to the second fixed lens barrel 2057 and the third fixed lens barrel 2016, and are respectively inserted through the slide hole 2008b and the second slide groove 2008c of the second movable lens barrel 2008, thereby supporting the second movable lens barrel 2008 for movement back and forth along the optical axis. The second motor 2018 is fixed to the third fixed lens barrel 2016, and the output shaft 2007 of the motor 2018 is fitted into the first slide groove 2008a of the second movable lens barrel 2008, so that the second movable lens barrel 2008 is moved back and forth along the optical axis by the rotation of the motor 2018.

With the driving device having the above-described arrangement and construction, it is possible to achieve silent, rapid and accurate driving of a zoom lens.

Figure 31A:
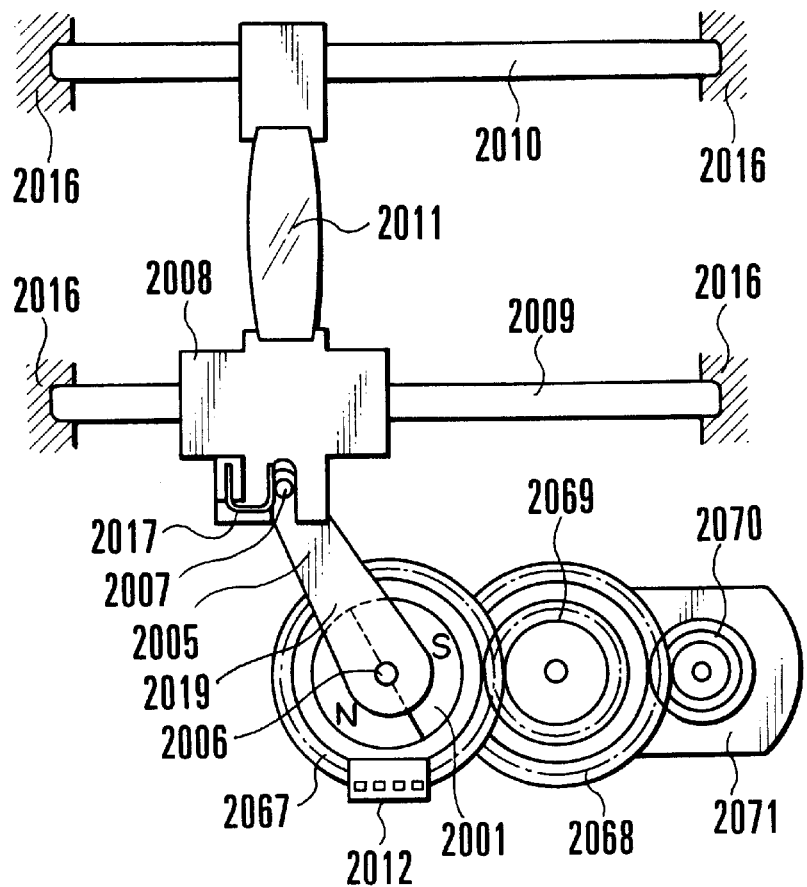
FIGS. 31(a) and 31(b) are diagrammatic views showing an essential portion of a modification of the embodiment shown in FIG. 27.
Figure 31B:
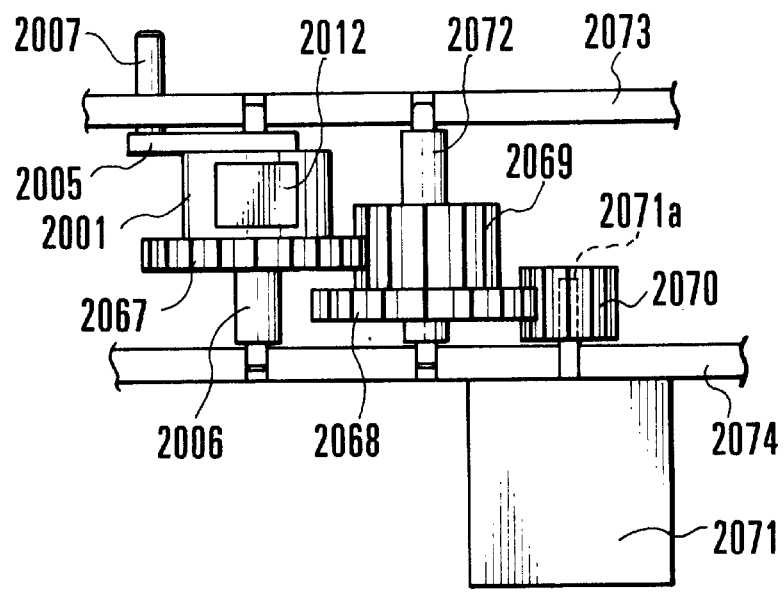

FIGS. 31(a) and 31(b) respectively are front and side elevational views showing the essential portion of another embodiment. In this embodiment, the arm 2005 is driven by a power source which differs from that used in the embodiment shown in FIG. 27. The embodiment shown in FIGS. 31(a) and 31(b) includes gears 2067 to 2070 which are molded in a material having high slidability, such as polyacetal resin, a known direct-current motor 2071, a rotating shaft 2072, and base plates 2073 and 2074. The rotor 2019 includes the permanent magnet 2001 of cylindrical shape, the arm 2005, the rotating shaft 2006, the slide shaft 2007, the gear 2067 and other associated elements.

The arm 2005, the rotating shaft 2006 and the slide shaft 2007 are integrally formed, and the arm 2005 is arranged to be positioned at right angles to the first guide bar 2009 at the center of the entire stroke of the lens barrel 2008. The permanent magnet 2001 and the gear 2067 are fixed to the rotating shaft 2006 by known means such as press-fitting. The Hall element 2012 is disposed so that it can oppose the boundary between the poles of the permanent magnet 2001 when the arm 2005 is perpendicular to the guide bar 2009. The gears 2068 and 2069 are integrally formed, and are fixed to the rotating shaft 2072 by known means such as press-fitting.

The gear 2070 is fixed to the output shaft 2071a of the motor 2071 by known means such as press-fitting. The respective base plates 2073 and 2074 rotatably support the rotating shafts 2006 and 2072. The Hall element 2012 is fixed to the base plate 2073 by fixing means (not shown), and the direct-current motor 2071 is fixed to the base plate 2074. The gear 2067 fixed to the rotor 2019 is meshed with the gear 2069, and the gear 2068 which rotates integrally with the gear 2069 is meshed with the gear 2070 fixed to the output shaft 2071a of the motor 2071.

In the above-described arrangement and construction, the rotation of the motor 2071 is transmitted to the rotor 2019 via the four gears 2067 to 2070, whereby the lens barrel 2008 which is a driven object is moved back and forth along the optical axis by the rotation of the rotor 2019. The Hall element 2012 outputs a voltage value corresponding to the position of the lens barrel 2008, for example, by a method utilizing the sinusoidally magnetized permanent magnet 2001 used in the embodiment shown in FIG. 27 or by a method utilizing a lens barrel having a slide groove with a novel cam shape (refer to FIG. 18). According to the above-described arrangement and construction, the driving circuit described above with reference to FIG. 29 can be used without modification.

In this embodiment, the direct-current motor is employed as a driving power source, and its torque is amplified through the gears so that it can be used to drive the lens barrel which is a driven object. Accordingly, since the driven object can be driven with a strong force, the above-described embodiment is particularly suited to a heavy-weight driven object.

Although reference has been made to the embodiments in each of which the driving device according to the present invention is applied to a device for driving an optical element, the driving device according to the present invention can be applied to various devices or apparatus.

An example which is arranged to drive an object other than an optical lens in accordance with the present invention will be described below with reference to FIG. 32 which shows a driving device for driving a magnetic head.

The example shown in FIG. 32 includes a movable base 4000, first and second guide bars 4010 and 4020, a magnetic head 4030, a flexible printed circuit board 4040, and a motor 5000 which is a driving source.

As in the embodiment of the present invention shown in FIG. 14, the motor 5000 includes a rotor 5010 containing a permanent magnet magnetized to have a plurality of poles, a coil 5020, a stator yoke 5030, a Hall element 5040, an arm 5050, a driving pin 5060, a pressure spring 5070 and a case, which is not shown.

The first and second guide bars 4010 and 4020 are disposed to extend parallel to each other in the direction of movement of the movable base 4000. The movable base 4000 has a guide hole 4000a and a U-shaped groove 4000b. The first guide bar 4010 is inserted through the guide hole 4000a and the second guide 4020 is inserted through the U-shaped groove 4000b, whereby the movable base 4000 is supported for movement back and forth in the rectilinear direction.

The magnetic head 4030 of a known type is fixed to the movable base 4000, and is electrically connected to an electrical circuit (not shown) via the flexible printed circuit board 4040. The magnetic head 4030 is controlled by the electrical circuit (not shown) and performs writing and reading to and from a magnetic disk (not shown).

The movable base 4000 has a fitting groove 4000c and a spring fixing part 4000d. A driving pin 5060 of the motor 5000 is fitted through the fitting groove 4000c, and the pressure spring 5070 is fixed to the spring fixing part 4000d to press the driving pin 5060 against one side face of the fitting groove 4000c, whereby the rotation of the rotor 5010 of the motor 5000 is converted into the rectilinear motion of the movable base 4000 without looseness.

The relationship between the torque generated by the motor 5000 and the position of the movable base 4000 is such that the motor 5000 generates its maximum torque approximately at the center of the moving stroke of the movable base 4000, as in the case of the embodiment shown in FIG. 14, and the Hall element 5040 is fixed by the case (not shown) at the position at which the direction of the arm 5050 and the direction of movement of the movable base 4000 are perpendicular to each other and at a position opposite to the boundary between the south pole and the north pole of the sinusoidally magnetized permanent magnet of the rotor 5010.

In this arrangement and construction, by controlling the motion of the motor 5000 which is a driving power source, for example, by means of the electrical circuit shown in FIG. 16, the magnetic-head driving device according to this embodiment can operate at a high speed and with high precision relative to the direction of movement of the movable base. Accordingly, the driving device according to this embodiment can achieve higher-density recording of information on a magnetic disk and higher-speed access to the magnetic disk than a conventional type of magnetic-head driving device arranged to drive a movable base by means of a stepping motor.

What is claimed is:

1. A lens driving device, comprising:
    a stator;
    a rotor magnetized to have a plurality of poles;
    an arm fixed to said rotor in such a manner as to be rotatable together with said rotor;
    a moving member for rectilinearly moving a lens in response to a rotation of said arm; and
    a coil for causing said stator to generate a magnetic flux to rotate said rotor.

2. A lens driving device according to claim 1, wherein said moving member moves said lens along an optical axis thereof.

3. A lens driving device according to claim 2, wherein said moving member includes a holding member for holding said lens, a guide bar for guiding a movement of said holding member along said optical axis, and a clamping member provided on said holding member for clamping an end of said arm.

4. A lens driving device according to claim 3, wherein said clamping member clamps the end of said arm by elastic force.

5. A lens driving device according to claim 3, wherein said clamping member includes a pair of members each having a portion of arcuate cross-sectional shape which comes into contact with said arm.

6. A lens driving device according to claim 3, wherein said clamping member includes a pair of members each having a projection which comes into contact with said arm.

7. A lens driving device according to claim 1, wherein said rotor includes a rotating shaft having opposite ends, one end of which is of spherical shape, and a bearing having a tapered portion for receiving said one end of said rotating shaft, a thickness of said rotor which is taken along said rotating shaft being selected to be greater than a thickness of said stator which is taken along said rotating shaft, said one end of said rotor projecting from a corresponding end of said stator along said rotating shaft by a smaller amount than does another end of said rotor.

8. A lens driving device according to claim 1, wherein said stator includes a pair of stator portions forming a gap between opposed ends thereof in a direction perpendicular to said rotating shaft of said rotor, said pair of stator portions being disposed to surround said rotor and one of said pair of stator portions being inserted through said coil.

9. A lens driving device according to claim 8, wherein each of said pair of stator portions has a groove at a position which is 90° rotated from a position of said gap in a rotating direction of said rotor.

10. A lens driving device according to claim 9, wherein said groove is approximately equal to said gap in width.

11. A lens driving device according to claim 8, wherein each of said pair of stator portions has a groove at a position slightly offset from the position which is 90° rotated from the position of said gap in the rotating direction of said rotor.

12. A lens driving device according to claim 11, wherein said grove is approximately equal to said gap in width.

13. A lens driving device according to claim 1, wherein said rotor is magnetized to have two poles.

14. A lens driving device according to claim 1, further comprising detecting means for detecting a position of said lens, a supply device for supplying an electric current to said coil, and a controller for controlling said supply device according to an output of said detecting means.

15. A lens driving device according to claim 14, wherein said detecting means has a sensor for detecting a rotational position of said rotor.

16. A lens driving device according to claim 15, wherein said sensor has a magnetic sensor.

17. A lens driving device according to claim 16, wherein said sensor has a Hall element.

18. A lens driving device according to claim 16, wherein said rotor is magnetized in such a manner that a magnetic field strength detected by said sensor sinusoidally varies with a rotation of said rotor.

19. A lens driving device according to claim 18, wherein
    $X = R \cdot \sin \theta$ (R is a constant)
    $S = B \cdot \sin^n \theta$ (B is a constant and n is an arbitrary natural number),
    where $\theta$ represents the rotational position of said rotor, X represents the position of said lens, and S represents a magnitude of an output of said sensor.

20. A lens driving device according to claim 14, wherein said moving member is constructed so that a rotational angle of said rotor and an amount of movement of said lens can form a linear relationship.

21. A lens driving device according to claim 20, wherein said moving member includes a cam having a shape which is determined so that the rotational angle of said rotor and the amount of movement of said lens can form the linear relationship.

22. A lens driving device according to claim 21, wherein said rotor is magnetized in such a manner that a strength of a magnetic field generated from said rotor varies trapezoidally along a rotating direction of said rotor.

23. A lens driving device according to claim 14, wherein said controller controls said supply device according to an output value of said detecting means and an instruction value relative to the position of said lens.

24. A lens driving device according to claim 23, wherein said controller controls said supply device according to a difference between the output value and the instruction value.

25. A lens driving device according to claim 24, wherein said lens serves to form an image of a subject on a detecting face, and said controller controls said supply device so that a sufficient electric current to move said lens can be supplied to said coil when the difference between the output value and the instruction value corresponds to a deviation of not less than half of a radius of an allowable circle of confusion in terms of a state of the image on the detecting face.

26. A lens driving device according to claim 23, further comprising varying means for varying an output characteristic of said detecting means.

27. A lens driving device according to claim 26, wherein the output characteristic includes a gain.

28. A lens driving device according to claim 26, wherein the output characteristic includes an offset.

29. A lens driving device according to claim 26, wherein the output characteristic includes a gain and an offset.

30. A lens driving device according to claim 26, wherein said varying means varies the output characteristic according to a variation in temperature.

31. A lens driving device according to claim 30, wherein the output characteristic includes a gain and an offset.

32. A lens driving device according to claim 30, wherein
    $X = R \cdot \sin \theta$ (R is a constant)
    $S = B \cdot \sin^n \theta$ (B is a constant and n is an arbitrary natural number),
    where $\theta$ represents a rotational position of said rotor, X represents the position of said lens, and S represents a magnitude of the output of said detecting means.

33. A lens driving device according to claim 32, wherein said moving member is constructed so that a rotational angle of said rotor and an amount of movement of said lens can form a linear relationship.

34. A lens driving device according to claim 33, wherein said moving member includes a cam having a shape which is determined so that the rotational angle of said rotor and the amount of movement of said lens can form the linear relationship.

35. A lens driving device according to claim 34, wherein said rotor is magnetized in such a manner that a strength of a magnetic field relative to said rotor varies trapezoidally along a rotating direction of said rotor.

36. A lens driving device according to claim 1, wherein a rotational position of said rotor which corresponds to an intermediate position in a moving range of said lens is a position at which a torque generated in said rotor by said magnetic field reaches its maximum.

37. A lens driving device according to claim 36, further comprising a member for restricting a rotational range of said rotor.

38. A lens driving device according to claim 36, wherein a rotational range of said rotor is an electrical angle of 24° to 120°.

39. A lens driving device according to claim 1, wherein said lens is a focusing lens group of a zoom lens.

40. A lens driving device according to claim 1, wherein said lens is a zooming lens group of a zoom lens.

41. An optical apparatus arranged to move a lens of an optical system by using a lens driving device according to any one of claims 1 to 40.

* * * * *

UNITED STATES PATENT AND TRADEMARK OFFICE
CERTIFICATE OF CORRECTION

PATENT NO. : 5,900,995

DATED : May 4, 1999

INVENTOR(S) : Hiroshi AKADA, et al.

It is certified that error appears in the above-identified patent and that said Letters Patent is hereby corrected as shown below:

COLUMN 2:

Line 43, "8(a)," should read --8(a)--.

COLUMN 4:

Line 1, "the-third" should read --the third--.

COLUMN 5:

Line 20, "35a" should read --35a,--.

COLUMN 8:

Line 44, "99°" should read --90°--.

COLUMN 13:

Line 38, "1066" should read --1060--.

UNITED STATES PATENT AND TRADEMARK OFFICE
CERTIFICATE OF CORRECTION

PATENT NO. : 5,900,995

DATED : May 4, 1999

INVENTOR(S) : Hiroshi AKADA, et al.

It is certified that error appears in the above-identified patent and that said Letters Patent is hereby corrected as shown below:

COLUMN 19:

Line 35, "is-shown)." should read --is shown).--.

COLUMN 20:

Line 37, "t o" should read --to--.

COLUMN 24:

Line 50, "H" should read --$\theta$--.

COLUMN 26:

Line 49, "back" should read
--back and forth along the optical axis.--
line 50, delete "A first stepping optical axis."

UNITED STATES PATENT AND TRADEMARK OFFICE
CERTIFICATE OF CORRECTION

PATENT NO. : 5,900,995

DATED : May 4, 1999

INVENTOR(S) : Hiroshi AKADA, et al.

Page 3 of 3

It is certified that error appears in the above-identified patent and that said Letters Patent is hereby corrected as shown below:

COLUMN 29:

Line 60, "grove" should read --groove--.

Signed and Sealed this

Twelfth Day of December, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO.   : 5,900,995
DATED        : May 4, 1999
INVENTOR(S)  : Hiroshi Akada, et al.

It is certified that error appears in the above-identified patent and that said Letters Patent is hereby corrected as shown below:

<u>Column 15,</u>
Line 17, "rotational angle 0" should read -- rotational angle $\theta$ --.

Signed and Sealed this

Fourth Day of December, 2001

*Attest:*

NICHOLAS P. GODICI
*Attesting Officer*   *Acting Director of the United States Patent and Trademark Office*